(12) United States Patent
Kawai et al.

(10) Patent No.: US 10,863,332 B2
(45) Date of Patent: Dec. 8, 2020

(54) ROADSIDE COMMUNICATION APPARATUS AND IN-VEHICLE COMMUNICATION APPARATUS

(71) Applicant: Mitsubishi Electric Corporation, Chiyoda-ku (JP)

(72) Inventors: Katsuya Kawai, Tokyo (JP); Masahiko Ikawa, Tokyo (JP); Yoshiaki Tsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/327,109

(22) PCT Filed: Sep. 21, 2016

(86) PCT No.: PCT/JP2016/077780
§ 371 (c)(1),
(2) Date: Feb. 21, 2019

(87) PCT Pub. No.: WO2018/055685
PCT Pub. Date: Mar. 29, 2018

(65) Prior Publication Data
US 2019/0215669 A1    Jul. 11, 2019

(51) Int. Cl.
*H04W 4/44* (2018.01)
*H04W 40/24* (2009.01)
(Continued)

(52) U.S. Cl.
CPC ............. *H04W 4/44* (2018.02); *H04L 69/28* (2013.01); *H04L 69/321* (2013.01);
(Continued)

(58) Field of Classification Search
None
See application file for complete search history.

(56) References Cited

U.S. PATENT DOCUMENTS

| 2005/0083866 A1 | 4/2005 | Kubotani et al. |
| 2006/0193282 A1 | 8/2006 | Ikawa et al. |
| 2011/0034201 A1* | 2/2011 | Hamada ................. H04L 67/12 455/517 |

FOREIGN PATENT DOCUMENTS

| JP | 4999989 B2 | 8/2012 |
| JP | 2013-48799 A | 3/2013 |

(Continued)

OTHER PUBLICATIONS

Office Action dated Feb. 24, 2020 in corresponding Canadian Patent Application No. 3,033,714, 5 pages.
(Continued)

*Primary Examiner* — Phuongchau Ba Nguyen
(74) *Attorney, Agent, or Firm* — Xsensus LLP

(57) ABSTRACT

An object of the present invention is to provide a roadside communication apparatus and an in-vehicle communication apparatus capable of reducing an increase in a traffic amount in a roadside-to-vehicle communication. A roadside communication apparatus according to the present invention includes: an inter-vehicle transmission-and-reception service processing unit transmitting and receiving a roadside-to-vehicle message and an inter-vehicle message; a communication transfer unit providing a transaction service and a transfer service; a roadside-to-vehicle application processing unit; an inter-vehicle application processing unit; a transmission-and-reception condition management unit managing a transmission-and-reception condition of an inter-vehicle message which the inter-vehicle application processing unit transmits to and receives from the communication device; and a roadside communication management unit managing a connection state with the communication device, wherein the roadside communication management unit manages a connection state with the communication (Continued)

device based on a reception condition of the inter-vehicle message notified by the transmission-and-reception condition management unit.

13 Claims, 15 Drawing Sheets

(51) Int. Cl.
| | |
|---|---|
| *H04W 4/46* | (2018.01) |
| *H04W 4/40* | (2018.01) |
| *H04W 4/20* | (2018.01) |
| *H04L 29/08* | (2006.01) |
| *H04W 76/10* | (2018.01) |
| *H04W 8/00* | (2009.01) |
| *H04W 80/08* | (2009.01) |
| *H04L 29/06* | (2006.01) |

(52) U.S. Cl.
CPC .............. *H04L 69/329* (2013.01); *H04W 4/20* (2013.01); *H04W 4/40* (2018.02); *H04W 4/46* (2018.02); *H04W 8/00* (2013.01); *H04W 40/24* (2013.01); *H04W 76/10* (2018.02); *H04W 80/08* (2013.01); *H04L 69/08* (2013.01)

(56) References Cited

FOREIGN PATENT DOCUMENTS

| | | |
|---|---|---|
| KR | 10-2006-0095868 A | 9/2006 |
| WO | WO 2005/039075 A1 | 4/2005 |
| WO | WO 2009/133740 A1 | 11/2009 |

OTHER PUBLICATIONS

Extended European Search Report dated May 31, 2019 in European Patent Application No. 16916756.6, 9 pages.
International Search Report dated Dec. 6, 2016 in PCT/JP2016/077780 filed Sep. 21, 2016.
"Dedicated short-range communication (DSRC) application sub layer, ARIB Standard, ARIB STD-T88, Ver. 1.1," Association of Radio Industries and Businesses, May 25, 2004, 489 pages (with partial English translation).
Korean Office Action dated Apr. 29, 2020, issued in corresponding Korean Patent Application No. 10-2019-7007459.
Office Action dated Sep. 17, 2020 in Indian Patent Application No. 201947007810, 7 pages.
Office Action dated Aug. 27, 2020, in corresponding to Korean patent Application No. 10-2019-7007459, 7 pages.

\* cited by examiner

FIG. 7
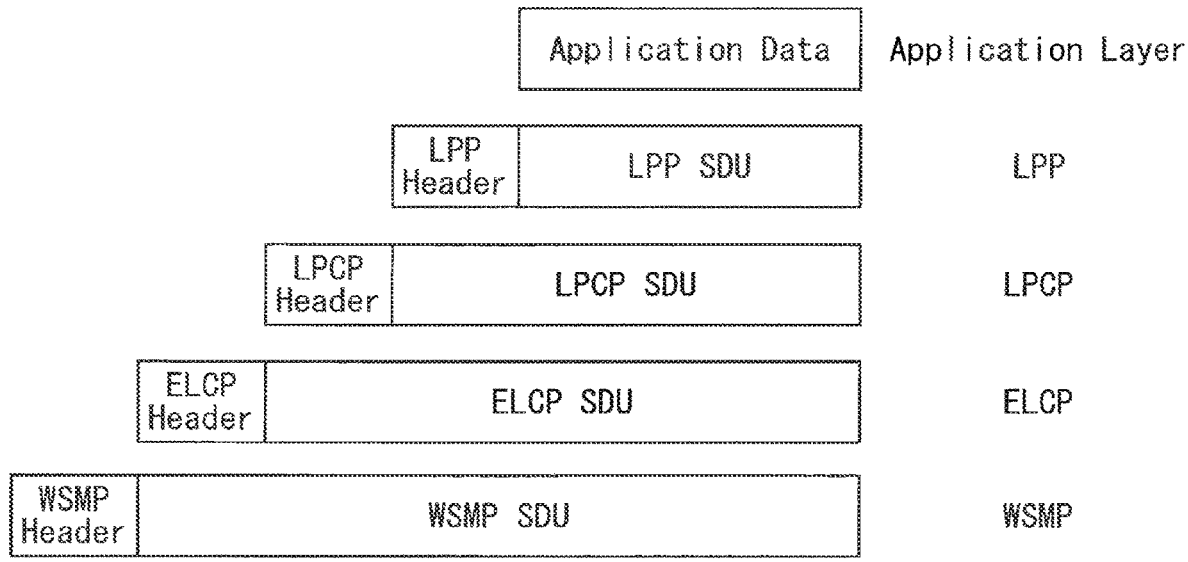
FIG. 8
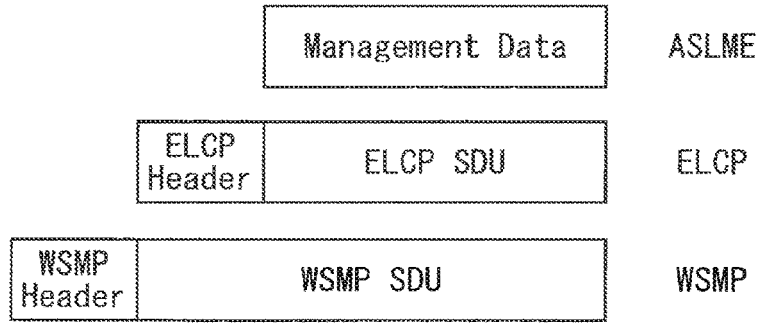
FIG. 9
| | 7(MSB) | 6 | 5 | 4 | 3 | 2 | 1 | 0(LSB) |
|---|---|---|---|---|---|---|---|---|
| 1 | ACCESS POINT IDENTIFIER | | | | PROTOCOL IDENTIFIER | | | |
| 2 | OPTIONAL FIELD OF PROTOCOL IDENTIFIER | | | | | | | |

F I G. 1 0

| ACCESS POINT IDENTIFIER | CONTROL PROTOCOL NAME | REMARKS |
|---|---|---|
| 0 | COMMUNICATION CONTROL MANAGEMENT | PROTOCOL PROCESSING IN COMMUNICATION CONTROL MANAGEMENT |
| 1 | LOCAL PORT CONTROL PROTOCOL | ACCESS POINT TO LOCAL ENVIRONMENT |
| 2 | LAN | CONTROL PROTOCOL |
| 3 | PPP | CONTROL PROTOCOL |
| 4-13 | RESERVATION | |
| 14 | LOCAL PORT CONTROL PROTOCOL 2 | ACCESS POINT TO LOCAL ENVIRONMENT (FOR ROAD COMPANY) |
| 15 | PROHIBITION OF USE | |

F I G. 1 1

| PROTOCOL IDENTIFIER | NAME OF CONTENTS | TYPE OF OPTIONAL FIELD |
|---|---|---|
| 0 | PROHIBITION OF USE | |
| 1 | ECHO PROCESSING (TRANSMISSION) | MsEchoParameter TYPE |
| 2 | ECHO PROCESSING (RESPONSE) | MsEchoParameter TYPE |
| 3 | EVENT PROCESSING | MsEventParameter TYPE |
| 4 | ACCESS MANAGEMENT (TRANSMISSION OF RANDOM NUMBER) | MsAuthCodeChallenge TYPE |
| 5 | ACCESS MANAGEMENT (SIGNATURE RESPONSE) | MsAuthCodeSignature TYPE |
| 6 | CONNECTION REQUEST | MsConnectRequest TYPE |
| 7 | CONNECTION RESPONSE | MsConnectResponse TYPE |
| 8 | CONNECTION RESPONSE CONFIRMATION | NULL |
| 9 | CONNECTION MAINTENANCE REQUEST | NULL |
| 10 | CONNECTION MAINTENANCE RESPONSE | NULL |
| 11-15 | RESERVATION | |

F I G . 1 2

|   | 7(MSB) | 6 | 5 | 4 | 3 | 2 | 1 | 0(LSB) |
|---|---|---|---|---|---|---|---|---|
| 1 | Preamble | bulkEnable | bulkTermination | pduGroup | | | | |
| 2 | SegmentNumber | | | | | | | |
| 3 | broadcastParameter (OPTION) | | | | | | | |
|   | RESERVATION(0) | | | | serviceTime | | | |
| 4 | serviceTime | | | | | | | |

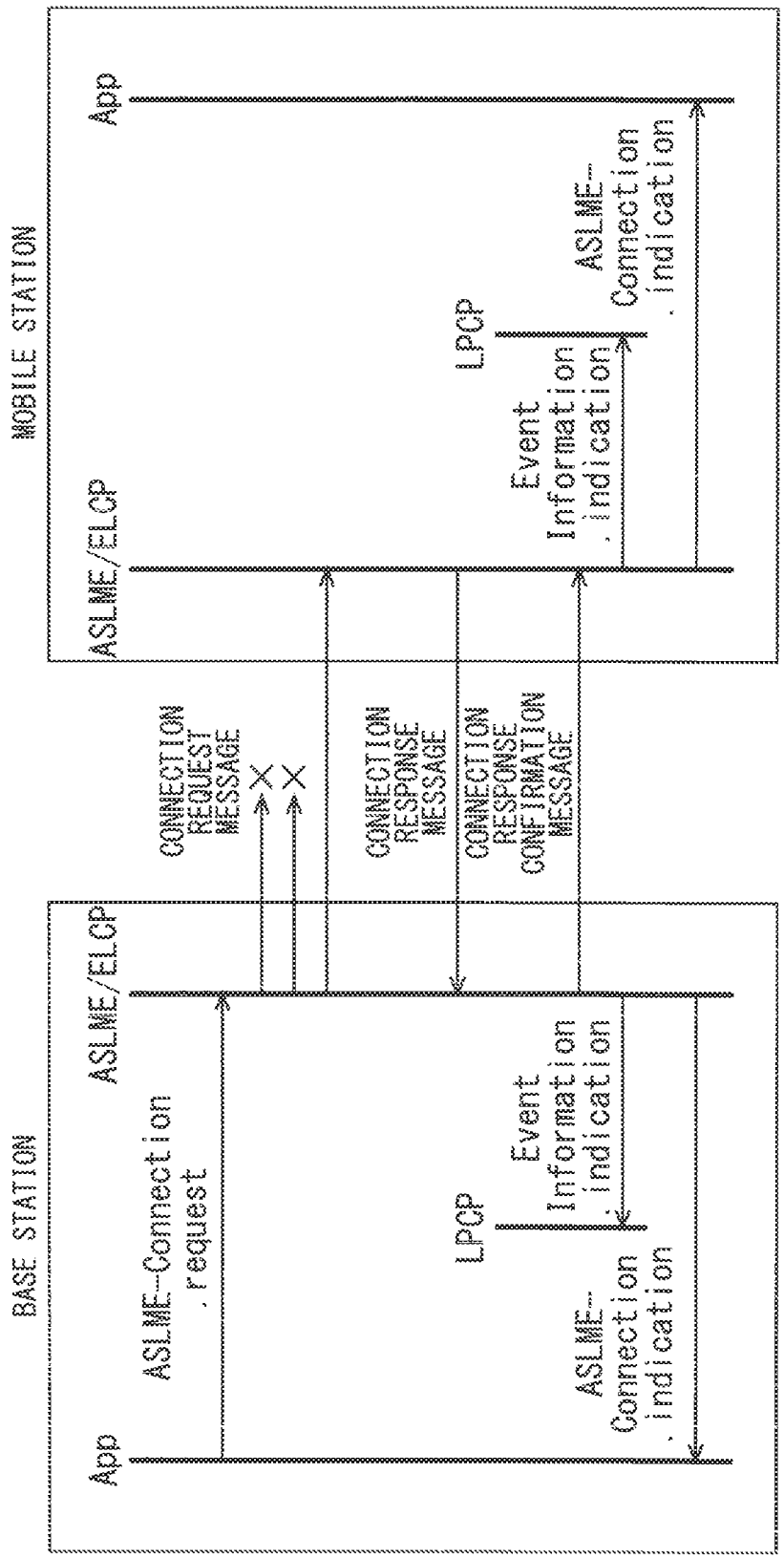

ROADSIDE COMMUNICATION APPARATUS AND IN-VEHICLE COMMUNICATION APPARATUS

TECHNICAL FIELD

The present invention relates to a roadside communication apparatus providing a mobile station with a service using an inter-vehicle communication between mobile stations traveling along a road and a roadside-to-vehicle communication between a base station disposed on a road and a mobile station traveling along, a road, and an in-vehicle communication apparatus receiving a service from a base station.

BACKGROUND ART

Considered recently is a practical application of a safety drive assistance system using a communication device performing an inter-vehicle communication and a roadside-to-vehicle communication. In an inter-vehicle communication system using the inter-vehicle communication, an information exchange application, in which mobile stations mutually transmit and receive information of themselves every constant period, is generally used. In the meanwhile, a roadside-to-vehicle communication system using the roadside-to-vehicle communication, the base station individually distributes information to each mobile station traveling around the base station, thus a connection state between communication devices needs to be managed.

Patent Document 1 and Non-Patent Document 1 conventionally disclose a method of using a local port control protocol (LPCP) to correspond to a multi-application and using a local port protocol (LPP) to adapt to a retransmission or a division-and-assembling of a message in the roadside-to-vehicle communication system. In this method, an individual communication is achieved using a connection management function in a lower-level communication protocol.

Also assumed in the inter-vehicle communication system in the future is a usage of a multi-application and a usage of an application which needs a retransmission or a division-and-assembling of a message. In the meanwhile, Patent Document 2 discloses a method of providing an in-vehicle communication apparatus and a cooperative roadside-to-vehicle and inter-vehicle communication system that provide a procedure of establishing an initial connection, adapt to a multi-application, retransmit or divide-and-assemble a message, and are adaptable to a roadside-to-vehicle communication system and an inter-vehicle communication system.

PRIOR ART DOCUMENTS

Patent Documents

Patent Document 1: International Publication No. 2005/039075
Patent Document 2: Japanese Patent No. 4999989

Non-Patent Documents

Non-Patent Document 1: "dedicated short-range communication (DSRC) application sub layer, ARIB standard, ARIB STD-T88, Ver. 1.1", Association of Radio Industries and Businesses

SUMMARY

Problem to be Solved by the Invention

In the in-vehicle communication apparatus and the cooperative roadside-to-vehicle and inter-vehicle communication system described in Patent Document 2, a roadside-to-vehicle message based on a protocol of a roadside-to-vehicle communication needs to be periodically transmitted at a time of starting the initial connection or maintaining a connection state, so that there is a problem that a traffic amount in the roadside-to-vehicle communication increases.

The present invention has been made to solve the above-mentioned problems, and an object thereof is to provide a roadside communication apparatus and an in-vehicle communication apparatus capable of reducing an increase in a traffic amount in a roadside-to-vehicle communication.

Means to Solve the Problem

In order to solve the above-mentioned problems, a roadside communication apparatus according to the present invention is a roadside communication apparatus (100) being mounted on a base station and capable of performing a wireless communication with a communication device (200) being mounted on a mobile station, includes: an inter-vehicle transmission-and-reception service processing unit (1) transmitting and receiving a roadside-to-vehicle message based on a protocol of a roadside-to-vehicle communication and an inter-vehicle message based on a protocol of an inter-vehicle communication to and from the communication device (200); a communication transfer unit (2) providing a transaction service including a retransmission and division-and-assembling of the roadside-to-vehicle message being transmitted to and received from the communication device (200) via the inter-vehicle transmission-and-reception service processing unit (1) and a transfer service adding a local port number for identifying an upper protocol; a roadside-to-vehicle application processing unit (3) transmitting and receiving the roadside-to-vehicle message to and from the communication device (200) via the inter-vehicle transmission-and-reception service processing unit (1) and the communication transfer unit (2); an inter-vehicle application processing unit (4) transmitting and receiving an inter-vehicle message to and from the communication device (200) via the inter-vehicle transmission-and-reception service processing unit (1); a transmission-and-reception condition management unit (5) managing a transmission-and-reception condition of the inter-vehicle message which the inter-vehicle application processing unit (4) transmits to and receives from the communication device (200); and a roadside communication management unit (6) managing a connection state with the communication device (200), wherein the roadside communication management unit (6) manages a connection state with the communication device (200) based on a reception condition of the inter-vehicle message notified by the transmission-and-reception condition management unit (5).

An in-vehicle communication apparatus according to the present invention is an in-vehicle communication apparatus (200) being mounted on a mobile station and capable of performing a wireless communication with a communication device (100, 200) being mounted on a base station or another mobile station includes: an inter-vehicle transmission-and-reception service processing unit (1) transmitting and receiving a roadside-to-vehicle message based on a protocol of a roadside-to-vehicle communication and an inter-vehicle message based on a protocol of an inter-vehicle communication to and from the communication device (100, 200); a communication transfer unit (2) providing a transaction service including a retransmission and division-and-assembling of the roadside-to-vehicle message being transmitted to and received from the communication device (100, 200) via the inter-vehicle transmission-and-reception service processing unit (1) and a transfer service adding a local port number for identifying an upper protocol; a roadside-to-vehicle application processing unit (3) transmitting and receiving the roadside-to-vehicle message to and from the communication device (100, 200) via the inter-vehicle transmission-and-reception service processing unit (1) and the communication transfer unit (2); an inter-vehicle application processing unit (4) transmitting and receiving an inter-vehicle message to and from the communication device (100, 200) via the inter-vehicle transmission-and-reception service processing unit (1); a transmission-and-reception condition management unit (5) managing a transmission-and-reception condition of the inter-vehicle message which the inter-vehicle application processing unit (4) transmits to and receives from the communication device (100, 200); and an in-vehicle communication management unit (7) managing connection state with the communication device (100, 200), wherein the in-vehicle communication management unit (7) manages a connection state using a transmission-and-reception condition, of the inter-vehicle message notified by the transmission-and-reception condition management unit (5).

Effects of the Invention

According to the present invention, a roadside communication apparatus is a roadside communication apparatus (100) being mounted on a base station and capable of performing a wireless communication with a communication device (200) being mounted on a mobile station, includes: an inter-vehicle transmission-and-reception service processing unit (1) transmitting and receiving a roadside-to-vehicle message based on a protocol of a roadside-to-vehicle communication and an inter-vehicle message based on a protocol of an inter-vehicle communication to and from the communication device (200); a communication transfer unit (2) providing a transaction service including a retransmission and division-and-assembling of the roadside-to-vehicle message being transmitted to and received from the communication device (200) via the inter-vehicle transmission-and-reception service processing unit (1) and a transfer service adding a local port number for identifying an upper protocol; a roadside-to-vehicle application processing unit (3) transmitting and receiving the roadside-to-vehicle message to and from the communication device (200) via the inter-vehicle transmission-and-reception service processing unit (1) and the communication transfer unit (2); an inter-vehicle application processing unit (4) transmitting and receiving an inter-vehicle message to and from the communication device (200) via the inter-vehicle transmission-and-reception service processing unit (1); a transmission-and-reception condition management unit (5) managing a transmission-and-reception condition of the inter-vehicle message which the inter-vehicle application processing unit (4) transmits to and receives from the communication device (200); and a roadside communication management unit (6) managing a connection state with the communication device (200), wherein the roadside communication management unit (6) manages a connection state with the communication device (200) based on a reception condition of the inter-vehicle message notified by the transmission-and-reception condition management unit (5). Thus, an increase in a traffic amount in the roadside-to-vehicle communication can be suppressed.

An in-vehicle communication apparatus is an in-vehicle communication apparatus (200) being mounted on a mobile station and capable of performing a wireless communication with a communication device (100, 200) being mounted on a base station or another mobile station includes: an inter-vehicle transmission-and-reception service processing unit (1) transmitting and receiving a roadside-to-vehicle message based on a protocol of a roadside-to-vehicle communication and an inter-vehicle message based on a protocol of an inter-vehicle communication to and from the communication device (100, 200); a communication transfer unit (2) providing a transaction service including a retransmission and division-and-assembling of the roadside-to-vehicle message being transmitted to and received from the communication device (100, 200) via the inter-vehicle transmission-and-reception service processing unit (1) and a transfer service adding a local port number for identifying an upper protocol; a roadside-to-vehicle application processing unit (3) transmitting and receiving the roadside-to-vehicle message to and from the communication device (100, 200) via the inter-vehicle transmission-and-reception service processing unit (1) and the communication transfer unit (2); an inter-vehicle application processing unit (4) transmitting and receiving an inter-vehicle message to and from the communication device (100, 200) via the inter-vehicle transmission-and-reception service processing unit (1); transmission-and-reception condition management unit (5) managing transmission-and-reception condition of the inter-vehicle message which the inter-vehicle application processing unit (4) transmits to and receives from the communication device (100, 200); and an in-vehicle communication management unit (7) managing a connection state with the communication device (100, 200), wherein the in-vehicle communication management unit (7) manages a connection state using transmission-and-reception condition of the inter-vehicle message notified by the transmission-and-reception condition management unit (5). Thus, an increase in a traffic amount in the roadside-to-vehicle communication can be suppressed.

These and other objects, features, aspects and advantages of the present invention will become more apparent from the following detailed description of the present invention when taken in conjunction with the accompanying drawings.

BRIEF DESCRIPTION OF DRAWINGS

FIG. 7 A diagram showing a PDU configuration in transmitting application data according to the embodiment of the present invention.

FIG. 8 A diagram showing a PDU configuration in transmitting control data according to the embodiment of the present invention.

FIG. 9 A diagram showing a field format of access control information of an NCP-PDU according to the embodiment of the present invention.

FIG. 10 A diagram showing a value of an access point identifier of the NCP-PDU according to the embodiment of the present invention.

FIG. 11 A diagram showing a value of a protocol identifier of the NCP-PDU according to the embodiment of the present invention.

FIG. 12 A diagram showing a field format of communication control information of an ELCP-PDU according to the embodiment of the present invention.

FIG. 13 A sequence diagram showing an initial connection procedure in a case of not using an inter-vehicle message according to the embodiment of the present invention.

DESCRIPTION OF EMBODIMENT(S)

An embodiment of the present invention is described hereinafter base on the drawings.

Embodiment

<1-1. Protocol Configuration>

The embodiment of the present invention is described using FIG. 1 to FIG. 21. Note that a roadside communication apparatus and an in-vehicle communication apparatus according to the present embodiment are capable of providing a service as a communication device of a roadside-to-vehicle communication system, an inter-vehicle communication system, or a roadside-to-vehicle and inter-vehicle cooperation system. Described in the present embodiment is a case of mainly providing a service as a communication device of a roadside-to-vehicle communication system.

Figure 1:
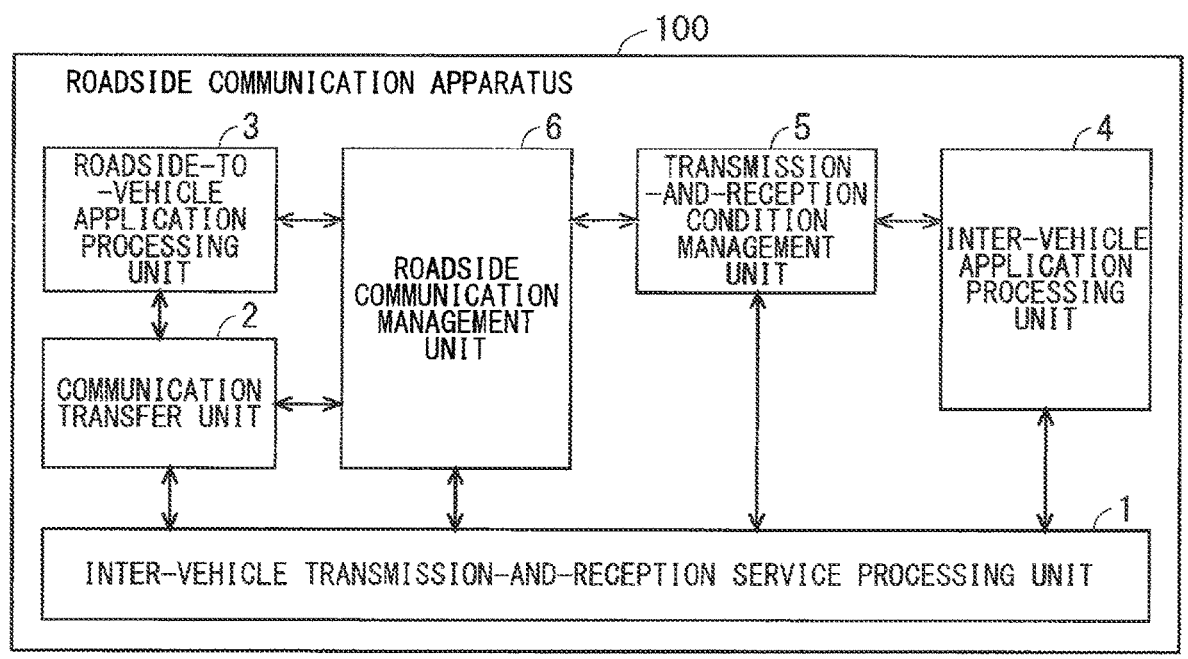
FIG. 1 A block diagram showing an example of a configuration of a roadside communication apparatus according to an embodiment of the present invention.
Figure 2:
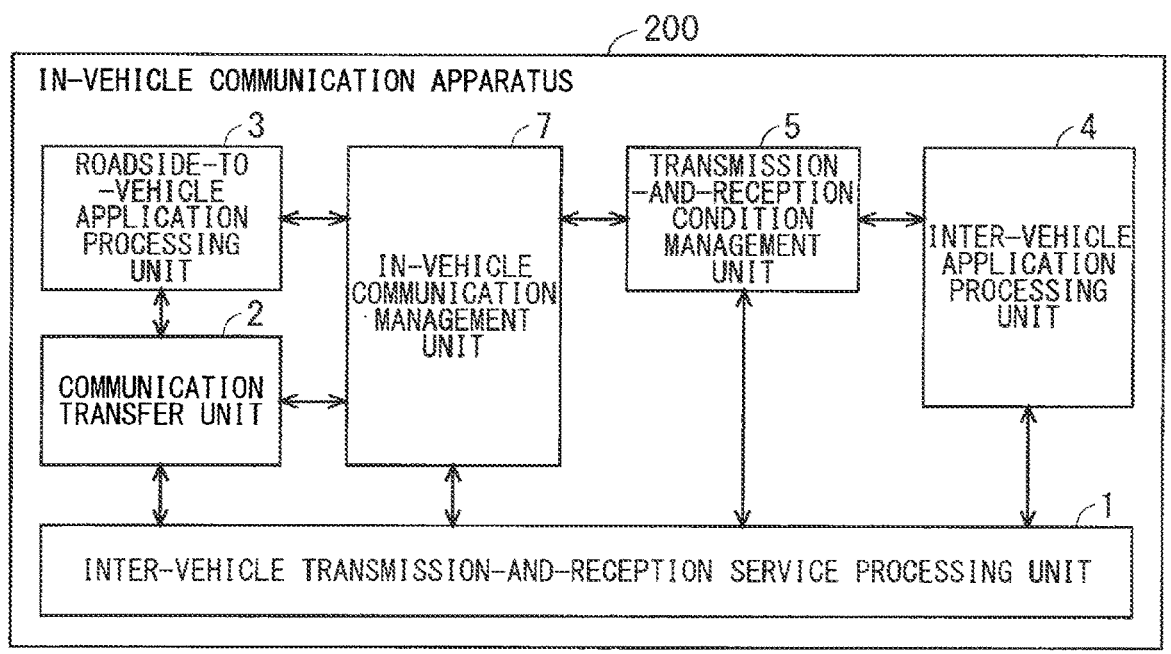
FIG. 2 A block diagram showing an example of a configuration of an in-vehicle communication apparatus according to the embodiment of the present invention.

FIG. 1 is block diagram showing a schematic protocol configuration of a roadside communication apparatus 100 according to the present embodiment, and FIG. 2 is a block diagram showing a schematic protocol configuration of an in-vehicle communication apparatus 200 according to the present embodiment. Note that similar or corresponding configurations are denoted by like reference numerals in FIG. 1 and FIG. 2, which is true for the entire specification.

The roadside communication apparatus 100 is mounted on a base station (roadside device) disposed around a road. The in-vehicle communication apparatus 200 is mounted on a mobile station (vehicle) traveling along a road. Wireless communication is performed between a mobile station, and a base station and between mobile stations, via the roadside communication apparatus 100 and the in-vehicle communication apparatus 200.

Herein, as the wireless communication, dedicated short range communications (DSRC) may be used, or a communication using a protocol adopted in a wireless local area network (LAN) or a cellular phone, for example, may also be applicable.

Note that the description of the present application is given by focusing on a mobile station referred to as "a subject vehicle" on which the in-vehicle communication apparatus 200 is mounted, and a vehicle other than "the subject vehicle" on which the in-vehicle communication apparatus 200 is mounted is referred to as "a surrounding vehicle". The surrounding vehicle may include one surrounding vehicle or also may include a plurality of surrounding vehicles.

As shown in FIG. 1, the roadside communication apparatus 100 includes an inter-vehicle transmission-and-reception service processing unit 1, a communication transfer unit 2, a roadside-to-vehicle application processing unit 3, an inter-vehicle application processing unit 4, a transmission-and-reception condition management unit 5, and a roadside communication management unit 6.

As shown in FIG. 2, the in-vehicle communication apparatus 200 includes the inter-vehicle transmission-and-reception service processing unit 1, the communication transfer unit 2, the roadside-to-vehicle application processing unit 3, the inter-vehicle application processing unit 4, the transmission-and-reception condition management unit 5, and an in-vehicle communication management unit 7.

The inter-vehicle transmission-and-reception service processing unit 1 provides a transmission service and a reception service for the wireless communication with the roadside communication apparatus 100 mounted on the base station and with the in-vehicle communication apparatus 200 mounted on the surrounding mobile station. The inter-vehicle transmission-and-reception service processing unit 1 is made up of a WAVE short message protocol (WSMP) described in "IEEE 1609.3", for example.

The communication transfer unit 2 intervenes between the inter-vehicle transmission-and-reception service processing unit 1 and the roadside-to-vehicle application processing unit 3, and provides a service for transmitting and receiving a message to and from the roadside-to-vehicle application processing unit 3 or the roadside communication management unit 6. The communication transfer unit 2 is made up of an LPP and an LPCP described in Non-Patent Document 1 and an extended link control protocol (ELCP) mediating between the LPCP and the inter-vehicle transmission-and-reception service processing unit 1.

The roadside-to-vehicle application processing unit 3 has a roadside-to-vehicle communication application operating on the communication transfer unit 2. The roadside-to-vehicle application processing unit 3 may have various applications in addition to the roadside-to-vehicle communication application.

The inter-vehicle application processing unit 4 has an inter-vehicle communication application operating on the inter-vehicle transmission-and-reception service processing unit 1. The inter-vehicle application processing unit 4 may have various applications in addition to the inter-vehicle communication application.

The transmission-and-reception condition management unit 5 intervenes between the inter-vehicle application processing unit 4 and the roadside communication management unit 6 or the in-vehicle communication management unit 7, and provides the roadside communication management unit 6 or the in-vehicle communication management unit 7 with a transmission-and-reception condition of an inter-vehicle message which the inter-vehicle application processing unit 4 transmits to and receives from the surrounding mobile station or the base station. The transmission-and-reception condition management unit 5 may be a part of the roadside-to-vehicle application included in the roadside-to-vehicle application processing unit 3, or may also be a part of the inter-vehicle application included in the inter-vehicle application processing unit 4.

The roadside communication management unit 6 is disposed to be in parallel with the communication transfer unit 2 and the roadside-to-vehicle application processing unit 3 to provide a connection procedure or a disconnection procedure of an initial connection for the connection with the surrounding mobile station and provide a communication connection management service for managing the communication condition.

The in-vehicle communication management unit 7 is disposed to be in parallel with the communication transfer unit 2 and the roadside-to-vehicle application processing unit 3 to provide a connection procedure or a disconnection procedure of an initial connection for the connection with the surrounding mobile station and the base station and provide a communication connection management service for managing the communication condition.

<1-2. Protocol Specification>

Described in detail hereinafter is a specification of an intelligent transport systems application sub-layer (ITS-ASL) made up of the communication transfer unit 2 in the roadside communication apparatus 100 and the in-vehicle communication apparatus 200 and the roadside communication management unit 6 or the in-vehicle communication management unit 7.

<1-2-1. Summary of Inter-Vehicle Communication Sub-Protocol>

Figure 3:
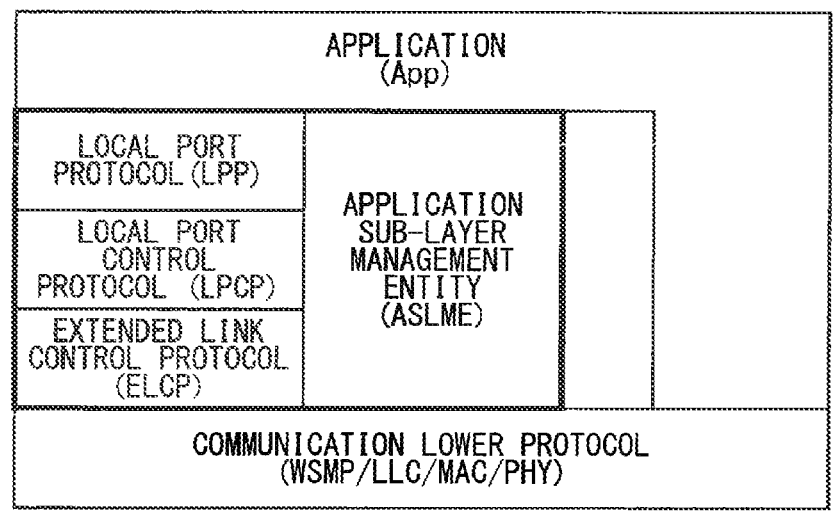
FIG. 3 A diagram showing a protocol configuration of the roadside communication apparatus and the in-vehicle communication apparatus according to the embodiment of the present invention.

FIG. 3 is a diagram showing a protocol configuration of the roadside communication apparatus 100 and the in-vehicle communication apparatus 200 including the ITS-ASL. The ITS-ASL is made up of a local port protocol (LPP) transferring data, a local port control protocol (LPCP), an extended link control protocol (ELCP), and an application sub-layer management entity (ASLME) managing the communication.

The LPP provides a connection management service for managing a transaction service such as a retransmission or a division-and-assembling of data and a communication condition such as an initial connection and disconnection. Accordingly, the LPP achieves a retransmission control or a division-and-assembling control required for the inter-vehicle communication system.

The LPCP has an interface for identifying an upper protocols of an application (App), for example, by using a local port number and providing a management service such as a data transfer and an event notification to the upper protocols. Accordingly, the LPCP achieves a multi-application in the roadside communication apparatus 100 and the in-vehicle communication apparatus 200.

The ELCP intervenes between the LPCP and a communication lower protocol to provide an application of the cooperative roadside-to-vehicle and inter-vehicle communication system with a priority control and complement a function of the ASLME. The ELCP provides an event transfer service for transferring a message to the upper protocol or the ASLME and an event notification service for transmitting a notification of an error and an event occurred in the ELCP to the upper protocol.

The ASLME provides the App and the ELCP with a connection management service for starting or disconnecting the initial connection or managing the communication condition.

IEEE802.11p protocol, communication protocol of 5.8 GHz band and UHF/VHF band, and long term evolution (LTE), for example, are assumed as a communication lower protocol. The communication lower protocol further has a management layer storing information of the communication lower protocol. The WSMP defined in IEEE 1609.3 intervenes between the ELCP and the IEEE 802.11p.

Figure 4:
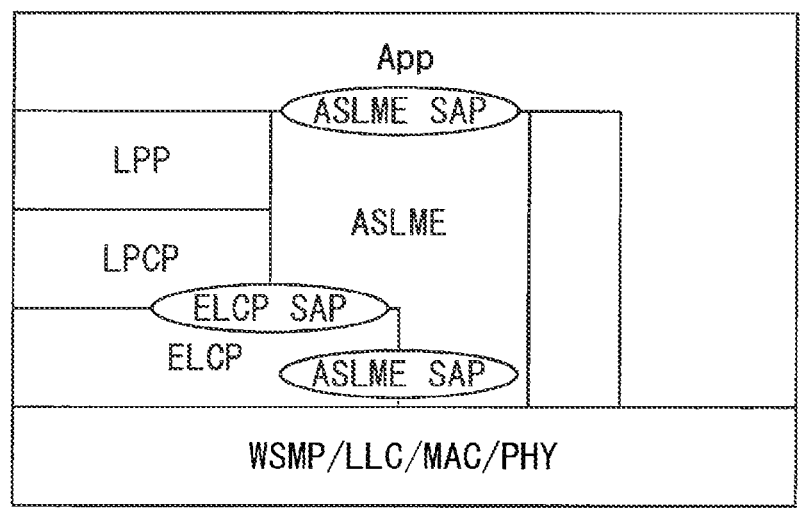
FIG. 4 A diagram showing a service interface according to the embodiment of the present invention.
Figure 5:
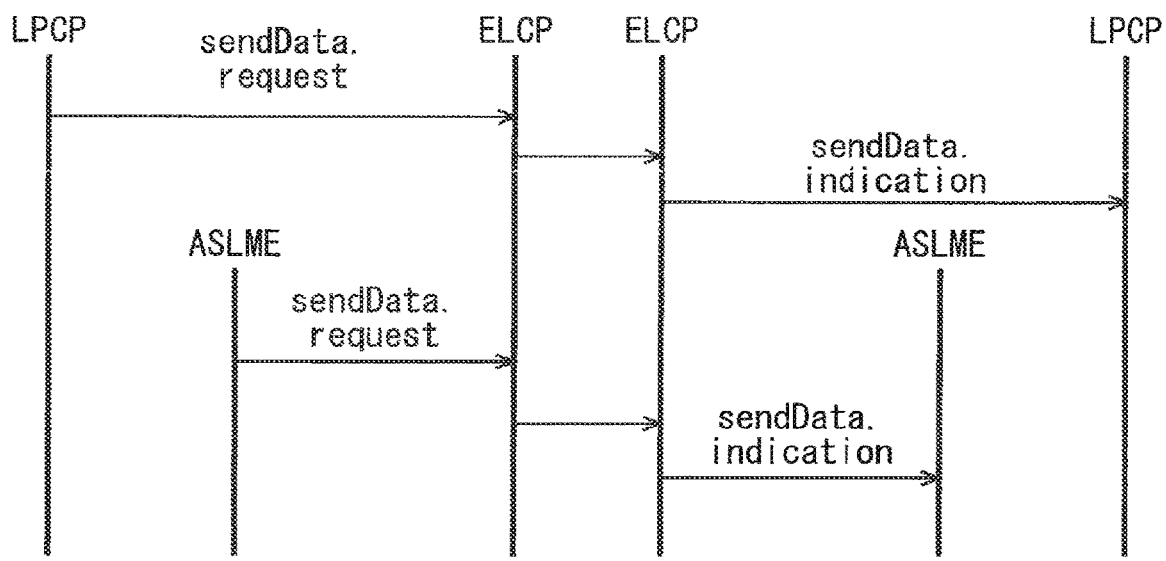
FIG. 5 A diagram showing an example of a sequence of providing a data transfer service according to the embodiment of the present invention.

FIG. 4 is a diagram showing a service interface (service access point (SAP)) provided by the ELCP and the ASLME in the ITS-ASL. Functions provided by the ELCP and the ASLME are as follows:

(1) Function provided by ELCP (ELCP SAP)
(1-1) Data transfer service
(1-2) Event notification service
(2) Function provided by ASLME (ALCP SAP)
(2-1) Connection management service
(2-2) Event notification service
<1-2-2. Summary of Function>
1. Function of Extended Link Control Protocol (ELCP)
1.1. Data Transfer Service The ELCP provides the upper protocol and the ASLME with the data transfer service from the LPCP. FIG. 5 is a diagram showing an example of a sequence that the ELCP provides the upper protocol and the ASLME with the data transfer service.

1.2. Event Notification Service

Figure 6:
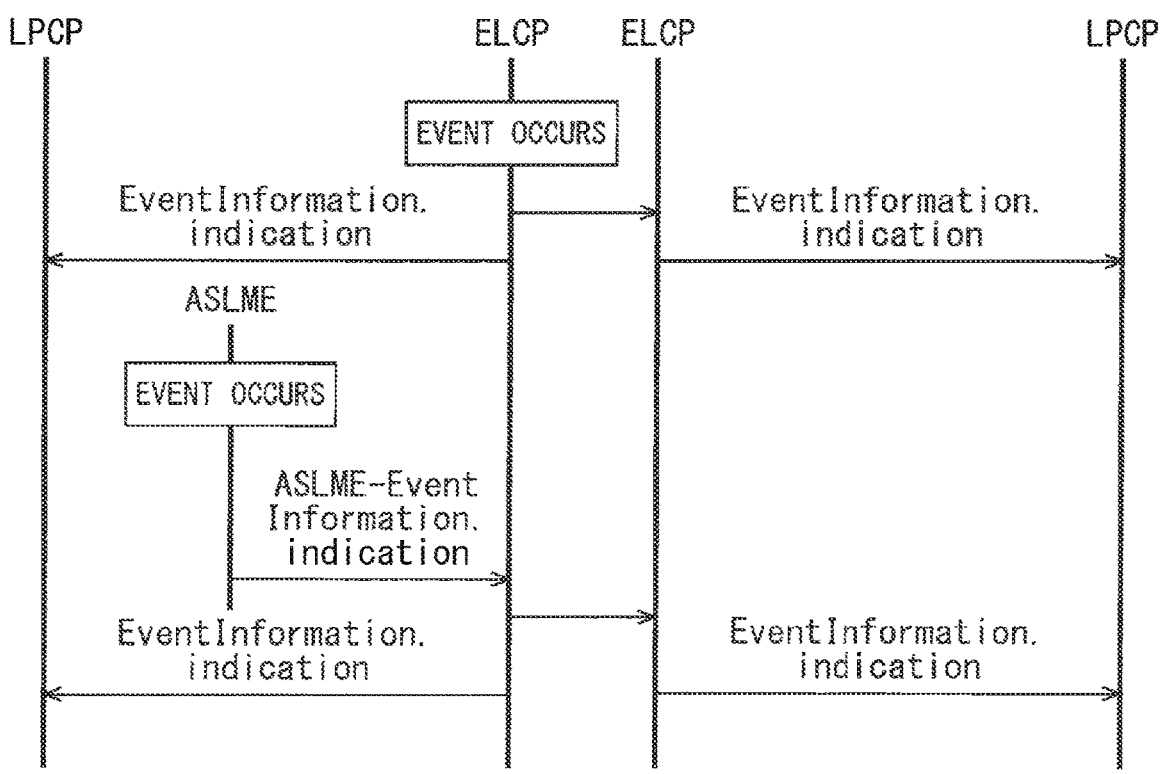
FIG. 6 A diagram showing an example of a sequence of providing an event notification service according to the embodiment of the present invention.

The ELCP provides the event notification service to transmit notifications of an event or an error occurred in the ELCP and an event received from the ASLME (a notification of a communication connection or disconnection, for example) to the upper protocol and the other station. FIG. 6 is a diagram showing an example that the ELCP provides the upper protocol and the ASLME with the event notification service.

2. Function of Application Sub-Layer Management Entity (ASLME)

2.1. Connection Management Service

The ASLME provides a connection management service for starting an initial connection of a communication connection required for the cooperative roadside-to-vehicle and inter-vehicle communication system and maintaining or transmitting a notification of a connection state.

2.2. Event Notification Service

The ASLME provides an event notification service from the LPCP to the upper protocol and the other station via the ELCP to transmit a notification of an event (a notification of a communication connection or disconnection, for example) or an error occurred in the ASLME.

<1-2-3. Service Interface (Service Access Point (SAP))>

Next, an interface included in the ELCP and the ASLME is described.

1. Description of Notation

A primitive type defined in the present embodiment is described below.

"request" is used when an upper layer transmits a request of a service to a lower layer.

"indication" is used when the lower layer transmits a notification of a service from the other party to the upper layer.

2. SAP Provided by ELCP (ELCP SAP)

The ELCP provides the LPCP and the ASLME with the following primitives as the data transfer service.

(1) Data transmission request primitive (SendDataUnit. request)

(2) Data reception notification primitive (SendDataUnit. indication)

The ELCP provides the LPCP with the following primitive as the event notification service.

(3) Event notification primitive (EventInformation. indication)

2.1. Data Transmission Request Primitive 2.1.1. Function

The data transmission request primitive is a service primitive for transmitting a request of the transmission of ASL-SDU to the other station.

2.1.2. Generation Opportunity

The LPCP or the ASLME generates the data transmission request primitive.

2.1.3. Variable of Primitive

The data transmission request primitive has the following variable.

SendDataUnit. request (linkAddress, parameter)

The variable linkAddress stores a link address for identifying the other party in the ELCP. A private link address or a group broadcast link address can be designated as the link address. When the group broadcast link address is designated, the ASL-SDU is distributed in a broadcast mode. The variable parameter stores the ASL-SDU transferred from the LPCP or the ASLME of a host station.

2.2. Incoming Data Notification Primitive 2.2.1. Function

The incoming data notification primitive is a service primitive for transmitting a notification of an incoming ASL-SDU from the other station.

2.2.2. Generation Opportunity

The ELCP generates the incoming data notification primitive at a time of indicating the incoming ASL-SDU.

2.2.3. Variable of Primitive

The incoming data notification primitive has the following variable.

SendDataUnit. indication (linkAddress, parameter)

The variable linkAddress stores a link address used in the ELCP. A private link address or a group broadcast link address is designated as the link address. The variable parameter stores the incoming ASL-SDU.

2.3. Event Notification Primitive 2.3.1. Function

The event notification primitive is a service primitive for transmitting a notification of an event such as an error occurred in the ELCP.

2.3.2. Generation Opportunity

The ELCP generates the event notification primitive at a time of transmitting a notification of an event such as an error occurred in the ELCP.

2.3.3. Variable of Primitive

The event notification primitive has the following variable.

EventInformation indication (linkAddress, status, [extensionParameter])

The variable linkAddress stores a link address for identifying the other party in the ELCP. The variable status stores a code indicating the occurred event. The variable extensionParameter stores information for complementing contents of the variable status as necessary. The variable extensionParameter is optionally set.

3. SAP Provided by ASLME (ASLME SAP)

The ASLME provides the application with the following primitives as a connection management service.

(1) Connection request primitive (ASLME-Connection. request)

(2) Connection notification primitive (ASLME-Notify. indication)

The ASLME provides the ELCP with the following primitive as the event notification service.

(3) Event notification primitive (ASLME-EventInformation)

3.1. Connection Request Primitive (ASLME-Connection)

3.1.1. Summary of Function

The event notification primitive is a primitive that the application transmits a request of the connection with the surrounding station and transfers information for maintaining the connection state.

3.1.2. Generation Opportunity

The application generates the event notification primitive.

3.1.3. Variable of Primitive

The event notification primitive has the following variable.

ASLME-Connection. request (portNo, requestCode, destinationLID)

The variable portNo stores an identifier for identifying a request source application. The variable requestCode stores an identifier indicating contents which the application requests. The variable destinationLID stores the identifier indicating the other station to which the connection request is transmitted, for example.

3.2. Connection Notification Primitive (ASLME-Connection. Indication)

3.2.1. Summary of Function

The connection notification primitive is a primitive that the ASLME transmits a notification of an initial connection or disconnection to the application.

3.2.2. Generation Opportunity

The ASLME generates the connection notification primitive.

3.2.3. Variable of Primitive

The connection notification primitive has the following variable.

ASLME-Notify (portNo, notifyCode, notifyParameter)

The variable portNo stores an identifier for identifying a request source application. The variable notifyCode stores an identifier indicating contents notified to the application. The variable notifyParameter stores a parameter value of contents notified to the application.

3.3. Event Notification Primitive 3.3.1. Function

The event notification primitive is a service primitive for transmitting a notification of an event such as an error occurred in the ASLME.

3.3.2. Generation Opportunity

The ASLME generates the event notification primitive at a time of transmitting a notification of an event such as an error occurred in the ASLME.

3.3.3. Variable of Primitive

The event notification primitive has the following variable.

ASLME-EventInformation. indication (linkAddress, status, [extensionParameter])

The variable linkAddress stores a link address for identifying the other party in the ELCP. The variable status stores a code indicating the occurred event. The variable extensionParameter stores information for complementing contents of the variable status as necessary. The variable extensionParameter is optionally set.

<1-2-4. Protocol Data Unit (PDU)>

1. Configuration of PDU

A protocol data unit (PDU) used in the ELCP and the ASLME is described. FIG. 7 shows a PDU configuration at a time of transmitting application data, and FIG. 8 shows a PDU configuration at a time of transmitting control data. A relationship between the PDU and a service data unit (SDU) is described here, in which a status where a certain layer includes no header is referred to as the SDU and a status where the layer is provided with a header is referred to as the PDU.

In the PDU shown in FIG. 7, the application data provided with an LPP header and an LPCP header, is passed to the ELCP, is provided with an ELCP header in the ELCP, and is then passed to a communication lower protocol (WSMP). In the PDU shown in FIG. 8, the control data generated in the ASLME is passed to the ELCP, is provided with the ELCP header in the ELCP, and is then passed to the communication lower protocol (WSMP).

In the PDU shown in FIG. 7, the application data is treated as an LPP SDU on the LPP and is added with the LPP header to become an LPP PDU, which is passed to the LPCP. The data passed from the LPP is treated as an LPCP SDU on the LPCP and is added with the LPCP header to become an LPCP PDU, which is passed to the ELCP. The data passed from the LPCP is treated as an ECLP SDU on the ELCP and is added with the ELCP header to become an ECLP PDU, which is passed to the WSMP. The data passed from the ELCP is treated as a WSMP SDU on the WSMP.

2. Format of Network Control Protocol-Protocol Data Unit (NCP-PDU)

The NCP including the LPCP allocates a different access point identifier to each NCP, and performs a data transmission-and-reception using a communication service interface of the ELCP. The ASLME allocates an access point identifier equivalent to the NCP, and performs a data transmission-and-reception with the ASLME of the other station using a communication service interface of the ELCP. Thus, a PDU format of the ASLME has a network control protocol data unit (NCP-PDU) the same as a PDU format of the NCP.

The NCP-PDU is made up of a control field for storing control information for transmitting a command of a procedure of the NCP (NCP header/access control information) and an information field for storing the PDU of the upper protocol (network control service unit (NCP service data unit (NCP-SDU))).

2.1. Identification of Connection

The access point identifier for identifying the NCP and the ASLME is transferred in the control field of the NCP-PDU. The link address for performing a connection identification for each NCP and ASLME, for example, is transferred as a variable of a service primitive provided by the ELCP.

2.2. Format of Information Field

In performing the data transfer, the NCP-SDU passed from the upper protocol is transmitted and stored in the information field. The information field such as the connection management in a case other than the data transmission is set to NULL (data of length 0).

2.3. Format of Control Field

The control field for transmitting a command of the procedure of the NCP and the ASLME stores the access control information. FIG. 9 shows the field format of the access control information.

(1) Access Point Identifier

The access point identifier is a value for identifying the NCP and the ASLME. FIG. 10 shows contents of the access point identifier.

(2) Protocol Identifier

The protocol identifier is control information for transmitting a command of the procedure of the NCP and the ASLME. The protocol identifier has an optional field multiply including additional information for complementing contents of control, and is used as necessary. The contents of the protocol identifier subfield are separately defined for each NCP. FIG. 11 shows the contents of the protocol identifier.

3. Format of ELCP Protocol Data Unit (ELCP-PDU)

The protocol data unit managed by the ELCP is the PDU of the ELCP, and is made up of a control field for storing control information for transmitting a command of a procedure of the ELCP (and ASLME) and an information field for storing the PDU passed from the LPCP (and the ASLME) (ELCP-SDU).

3.1. Identification of Connection

The link address and an element identifier (EID), for example, for identifying the connection are transferred as the variable of the service primitive or contents of the ASL-SDU in accordance with the communication lower layer, 3.2. Format of Information Field The ASL-SDU passed from the LPCP is segmented (bulk-segmented) or transmitted, and then stored in the information field. In a case of a broadcast communication, a checksum with 32 bit width is provided at the end of the ASL-SDU as an error check code. The checksum is a sum of 1's complement with 32 bit for the ASL-SDU, and if the end of the ASL-SDU is short of a test bit length (32 bit), the checksum stores 0 in a low-order digit and performs a calculation.

3.3. Format of Control Field

Communication control information is stored in the control field. The communication control information stores control information for transmitting a command of a procedure of the ELCP, and is shared between the base station and the mobile station for executing the procedure. FIG. 12 shows a field format of the communication control information.

(1) Bulk Transfer Enable Identifier (bulkEnable)

The bulk transfer enable identifier is an identifier for transmitting a command of enabling/disabling of the bulk transfer. It is indicated that the ASL-PDU in which the bulk transfer enable identifier indicates a true value (true) is a bulk segment which is bulk-transmitted. When segment processing is not performed, the bulk transfer enable identifier is set to a false value (false).

(2) Bulk Transfer Termination Identifier (bulkTermination)

The bulk transfer termination identifier is an identifier for indicating a final segment of a bulk transfer. It is indicated that the ASL-PDU in which the bulk transfer termination identifier indicates a true value (true) is a final segment which is bulk-transferred. When segment processing is not performed, the bulk transfer termination identifier is set to a false value (false).

(3) PDU Group Number (pduGroup)

The PDU group number is identification information of a bulk segment. One value is provided to the ASL-SDU on which segmented processing for the bulk transfer has not been performed yet. The value is provided modulo 32 in terms of a transmission queue, and is also provided to the ASL-SDU to which the bulk transfer is not applied. The same PDU group number is subject to assembling the bulk segment which is bulk-transferred.

(4) Segment Number (segmentNumber)

The segment number is a serial number indicating an order of segmentation of the bulk segment. 0 is provided to a bulk segment which has been segmented first, and an incremented value is sequentially allocated to the subsequent bulk segment. The order of the segment number is ensured in assembling the bulk segment. The segment number in a case of not applying the bulk transfer is set to 0.

(5) Broadcast Mode Subsidiary Variable (broadcastParameter)

The broadcast mode subsidiary variable is optionally set, and the following variable is added to the communication control information of the bulk segment which is segmented in processing of the broadcast mode control.

(a) Connection Monitoring Timer Value (serviceTime)

The connection monitoring timer value is a timer value being set to a connection management timer (connection timer for OBU (CTO)) of a mobile station in the communication area. The mobile station manages a valid period of a broadcast service using the connection monitoring timer value in a case of not performing a point-to-point communication (in a case where the communication connection operation is not performed). A unit thereof is millisecond, and a value ranging from 0 to 4095 is set. A time in a case of setting "0" as the value is infinity. However, "0" is set only in a test, and the mobile station receiving "0" in a real operation state discards the ASL-PDU having the value of "0". When the point-to-point communication is performed in parallel with the broadcast communication, the mobile station gives priority to the timer value provided in an ASL base station profile.

<1-2-5. Operation Procedure>

1. Data Transfer Procedure 1.1. Procedure of Transfer Service Processing (1) Transmission Service Processing When the data transmission request primitive (SendDataUnit. request) is invoked from the LPCP and the ASLME, the ELCP-SDU is obtained from the variable parameter. When the contents of the variable linkAddress is a private link address, bulk transfer processing on a transmission side defined by "1.2. procedure of bulk transfer control" described hereinafter is applied to the obtained ELCP-SDU. When the contents of the variable linkAddress is a group broadcast link address, broadcast mode control processing defined by "1.3. procedure of broadcast mode control" is applied to the obtained ELCP-SDU.

(2) Reception Service Processing

When the ELCP-PDU is stored in the transmission queue, the ELCP-SDU is distributed to the LPCP and the ASLME using the incoming data notification primitive (SendDataUnit. indication). At this time, the ELCP-SDU which is made up of the ELCP-PDU, from which the communication control information, a destination, identifier, and a transmission source identifier are deleted, and then passed to the LPCP and the ASLME is taken out and stored in the variable parameter. The variable linkAddress stores a link address of the ELCP-PDU. It is specified which set to a notification destination of the incoming data primitive, the ELCP and the ASLME, with reference to the access point identifier of the access control field in the ELCP-SDU.

1.2. Procedure of Bulk Transfer Control (1) Bulk Transfer Processing on Transmission Side When a size of the ELCP-SDU is equal to or smaller than a preset minimum size (SUU), the ASL-PDU is generated by, adding the communication control information in the case of not performing the segment processing, and is accumulated in the transmission queue. When the size of the ELCP-SDU exceeds the SUU, the ELCP-SDU is sequentially segmented in a size of the SUU from a top to be bulk-segmented, and the ELCP-PDU is generated by adding the communication control information for each bulk segment and transmitted.

(2) Bulk Transfer Processing on Reception Side

Processing described below is performed with reference to the communication control information of the ELCP-PDU stored in a reception queue in the bulk transfer processing on the reception side.

When there is a bulk segment in which the bulk transfer enable identifier indicates a true value (true), and all of ELCP-PDUs, each of which has the same PDU group number and transmission source identifier as the bulk segment, with a segment having a segment number 0 to a segment in which the bulk transfer termination identifier indicates a true value (true), are stored in the reception queue, the segments are connected in order of the segment number to reproduce the ELCP-SDU. When the bulk transfer enable identifier indicates a false value (false), the communication control information is deleted from the ELCP-PDU to reproduce the ELCP-SDU.

1.3. Procedure of Broadcast Mode Control (1) Broadcast Mode Control Processing on Transmission Side When the link address of the ELCP-SDU is the group broadcast link address, the ELCP applies the broadcast mode control, and performs processing described below.

After the error check code is provided, the ELCP-SDU is segmented in accordance with the procedure of the bulk transfer processing on the transmission side to generate the ASL-PDU, and the ASL-PDU is accumulated in the transmission queue for the broadcast. However, a preset minimum size (SUM) is applied to a unit of the segmentation. At this time, the PDU group number of the communication control information connected to the segment is provided modulo 32 in a sequential order. The optional field of the communication control information is enabled, and the broadcast mode subsidiary variable is added. An address value of the group broadcast link address is set to the link address of the ASL-PDU in this case. The ELCP-PDU stored in the transmission queue for the broadcast sequentially transmits all of the PDU for each PDU group number, and repeats the transmission for predetermined number of times. When the repeated transmission is completed, all of the segments having the PDU group number are discarded.

(2) Broadcast Mode Control Processing on Reception Side

Processing described below is performed with reference to the communication control information of the ELCP-PDU stored in the reception queue for the broadcast. The link address to be processed is the group broadcast link address, and the ELCP-PDU which does not correspond thereto is discarded.

When the bulk transfer enable identifier indicates a false value (false), the communication control information and the error check code are deleted from the ASL-PDU to reproduce the ELCP-SDU. When a value of the error check code is in error, the ELCP-SDU is not reproduced but the received data is discarded.

When there is a bulk segment in which the bulk transfer enable identifier of the ELCP-PDU indicates a true value (true), and all of ELCP-PDUs, each of which has the same PDU group number as the bulk segment, with a segment having a segment number 0 to a segment in which the bulk transfer termination identifier indicates a true value (true), are stored in the reception queue, the segments are connected in order of the segment number to reproduce the ELCP-SDU. When a value of the error check code is in error, the ELCP-SDU is not reproduced but the received data is discarded. After the connection and reproduction, the processing is suspended until a bulk segment having a different PDU group number is received, and the processing is started again in accordance with the contents of the communication control information after receiving the bulk segment. All of the bulk segments having the same PDU group number as that of the ELCP-SDU received during the suspension are discarded. When the bulk segment having the different PDU group number is received during the connection processing and the reproduction processing, the connection processing is discarded, and connection processing is started for a new PDU group number.

2. Initial Connection Procedure

In the roadside-to-vehicle and inter-vehicle cooperation system according to the present embodiment, the initial connection for starting an individual communication is performed.

2.1. Case of not Using Inter-Vehicle Message

FIG. 13 is a diagram showing a basic sequence of an initial connection procedure in a case of not using the inter-vehicle message.

(1) Start of Initial Connection Procedure in Base Station

The App of the base station designates "a connection request transmission" as the variable requestCode in the ASLME-Connection. request, and transmits a request to start the initial connection to the ASLME. The ASLME starts an initial connection procedure described below. It is also applicable that the initial connection procedure is not started due to the request from the App but started at a time of start-up.

(2) Transmission of Connection Request Message in Base Station

The ASLME of the base station transmits the connection request message to the ASLME of the surrounding mobile station via the broadcast communication using the SendDataUnit. request of the ELCP in accordance with a predetermined schedule.

(3) Reception of Connection Request Message and Transmission of Connection Response Message in Mobile Station Upon receiving the connection request message using SendDataUnit. indication of the ELCP, the ASLME of the mobile station confirms a connection state with reference to a connection management table. When the connection state is "connected", the initial connection procedure is completed. When the connection state is "not connected", the connection response message is transmitted to the ASLME of the base station via the individual communication using the SendDataUnit. request of the ELCP.

(4) Reception of Connection Response Message and Transmission of Connection Response Confirmation Message in Base Station Upon receiving the connection response message using SendDataUnit. indication of the ELCP, the ASLME of the base station confirms a connection state with the other station indicated by the connection response message with reference to the connection management table. When the connection state is "connected", the initial connection procedure is completed. When the connection state is "not connected", the connection response confirmation message is transmitted to the ASLME of the mobile station via the individual communication using the SendDataUnit. request of the ELCP. Finally, initial connection completion processing is performed to complete the initial connection procedure.

(5) Reception of Connection Response Confirmation Message in Mobile, Station

Upon receiving the connection response confirmation message using SendDataUnit. indication of the ELCP, the ASLME of the mobile station confirms a connection state with reference to a connection management table. When the connection state "connected", the initial connection procedure is completed. When the connection state is "not connected", initial connection completion processing is performed, and the initial connection procedure is completed.

2.2. Case of Using Inter-Vehicle Message

Figure 14:
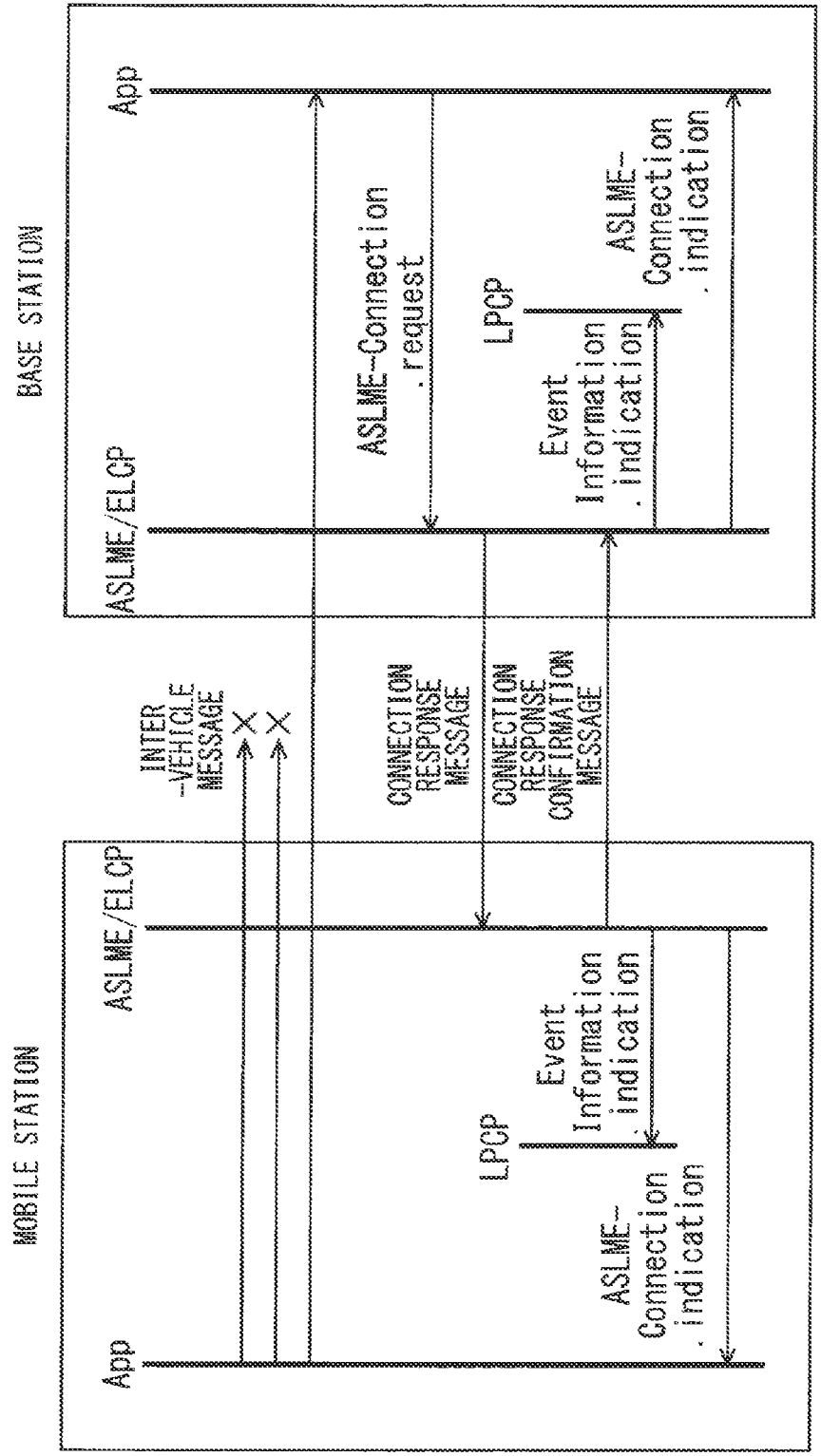
FIG. 14 A sequence diagram showing an initial connection procedure in a case of using the inter-vehicle message according to the embodiment of the present invention.

FIG. 14 is a diagram showing a basic sequence of an initial connection procedure in a case of using the inter-vehicle message.

(1) Transmission of Inter-Vehicle Message in Mobile Station

The App of the mobile station generates the inter-vehicle message in accordance with a predetermined schedule, and transmits the inter-vehicle message to the surrounding mobile station and the App of the base station via the broadcast communication.

(2) Reception of Inter-Vehicle Message and Start of Initial Connection Procedure in Base Station Upon receiving the inter-vehicle message, the App of the base station designates "a connection request transmission" as the variable requestCode in the ASLME-Connection. request, and transmits a request to start the initial connection to the ASLME. The ASLME starts an initial connection procedure described below.

(3) Transmission of Connection Response Message in Base Station

Upon receiving the initial connection start request, the ASLME of the base station confirms a connection state with reference to a connection management table. When the connection state is "connected", the initial connection procedure is completed. When the connection state is "not connected", the connection response message is transmitted to the ASLME of the mobile station via the individual communication using the SendDataUnit. request of the ELCP.

(4) Reception of Connection Response Message and Transmission of Connection Response Confirmation Message in Mobile Station Upon receiving the connection response message using SendDataUnit. indication of the ELCP, the ASLME of the mobile station confirms a connection state with the other station indicated by the connection response message with reference to the connection management table. When the connection state is "connected", the initial connection procedure is completed. When the connection state is "not connected", the connection response confirmation message is transmitted to the ASLME of the base station via the individual communication using the SendDataUnit. request of the ELCP. Finally, initial connection completion processing is performed to complete the initial connection procedure.

(5) Reception of connection response confirmation message in base station

Upon receiving the connection response confirmation message using SendDataUnit. indication of the ELCP, the ASLME of the base station confirms a connection state with reference to a connection management table. When the connection state is "connected", the initial connection procedure is completed. When the connection state is "not connected", initial connection completion processing is performed, and the initial connection procedure is completed.

2.3. Initial Connection Completion Processing

In the mobile station and the base station, the LPCP is set to be in an enable state for the communication with the other station at the end of the initial connection procedure, and is added to the connection management table as "connected". The ASLME further issues "an initial connection notification" using the ASLME-Connection. indication to the App. In the similar manner, the ASLME issues "an initial connection notification" using the ASLME-EventInformation. indication to the ELCP. Upon receiving this, the ELCP issues "an initial connection notification" using EventInformation, indication to the LPCP.

3. Connection Maintaining Procedure

In the roadside-to-vehicle and inter-vehicle cooperation system according to the present embodiment, a connection maintenance for monitoring the state of the individual communication and continuing the connection is performed after completing the initial connection procedure. Used in this procedure are a transmission schedule monitoring timer for monitoring whether a constant transmission of the request to the other station is ensured (watchdog timer for transmission schedule (WTTS)), a communication connection management timer for monitoring a reception state of the request from the other station (connection timer for request (CT1)), and a communication connection management timer for monitoring a reception state of the response from the other station (connection timer for response (CT2)).

3.1. Case of not Using Inter-Vehicle Message

Figure 15:
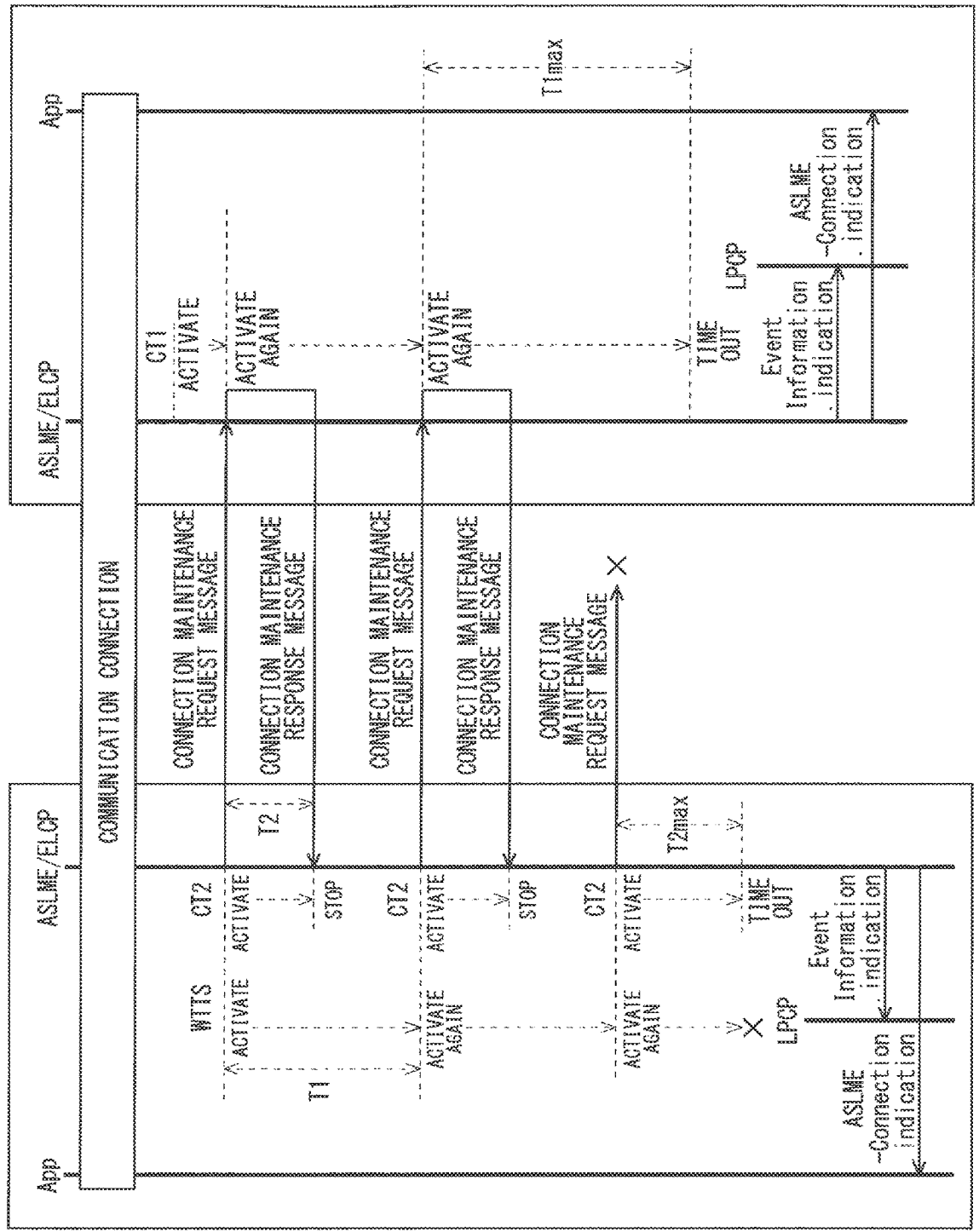
FIG. 15 A sequence diagram showing a connection maintaining procedure in the case of not using the inter-vehicle message according to the embodiment of the present invention.

FIG. 15 is a diagram showing a basic sequence of a connection maintaining procedure in a case of not using the inter-vehicle message in the ASLME.

(1) Communication Connection Management Procedure of Base Station

The ASLME of the base station generates the WTTS and CT2 for each mobile station at a time of completing the initial connection procedure. At this time, T2max is set to the CT2, and T1max is set to the WTTS. The ASLME of the base station activates the CT2 and the WTTS upon transmission of the connection maintenance request message for managing the communication connection state with the mobile station. When the communication lower layer does not provide a retransmission function, the connection maintenance request message performs control of retransmission using a retransmission timer and a retransmission counter.

The CT2 is suspended when the connection maintenance response message corresponding thereto is received. The WTTS is activated again when a next connection maintenance request message is transmitted. When the CT2 times out before the connection maintenance response message can be received, or when the WTTS times out before the next connection maintenance request message can be transmitted, the connection maintenance completion processing is performed, and the connection maintaining procedure is completed.

(2) Communication Connection Management Procedure of Mobile Station

The ASLME of the mobile station generates the CT1 at the time of the communication connection. A connection management timer value of the mobile station is set to the generated CT1 with reference to the connection management timer value from a base station profile received using the connection request message, and the CT1 is activated. Subsequently, the CT1 is activated again every time the notification of the enable service primitive is received from the base station. When the CT1 times out before the enable service primitive is received from the base station, the connection maintenance completion processing is performed, and the connection maintaining procedure is completed.

3.2. Case of Using Inter-Vehicle Message (Base Station and Mobile Station)

Figure 16:
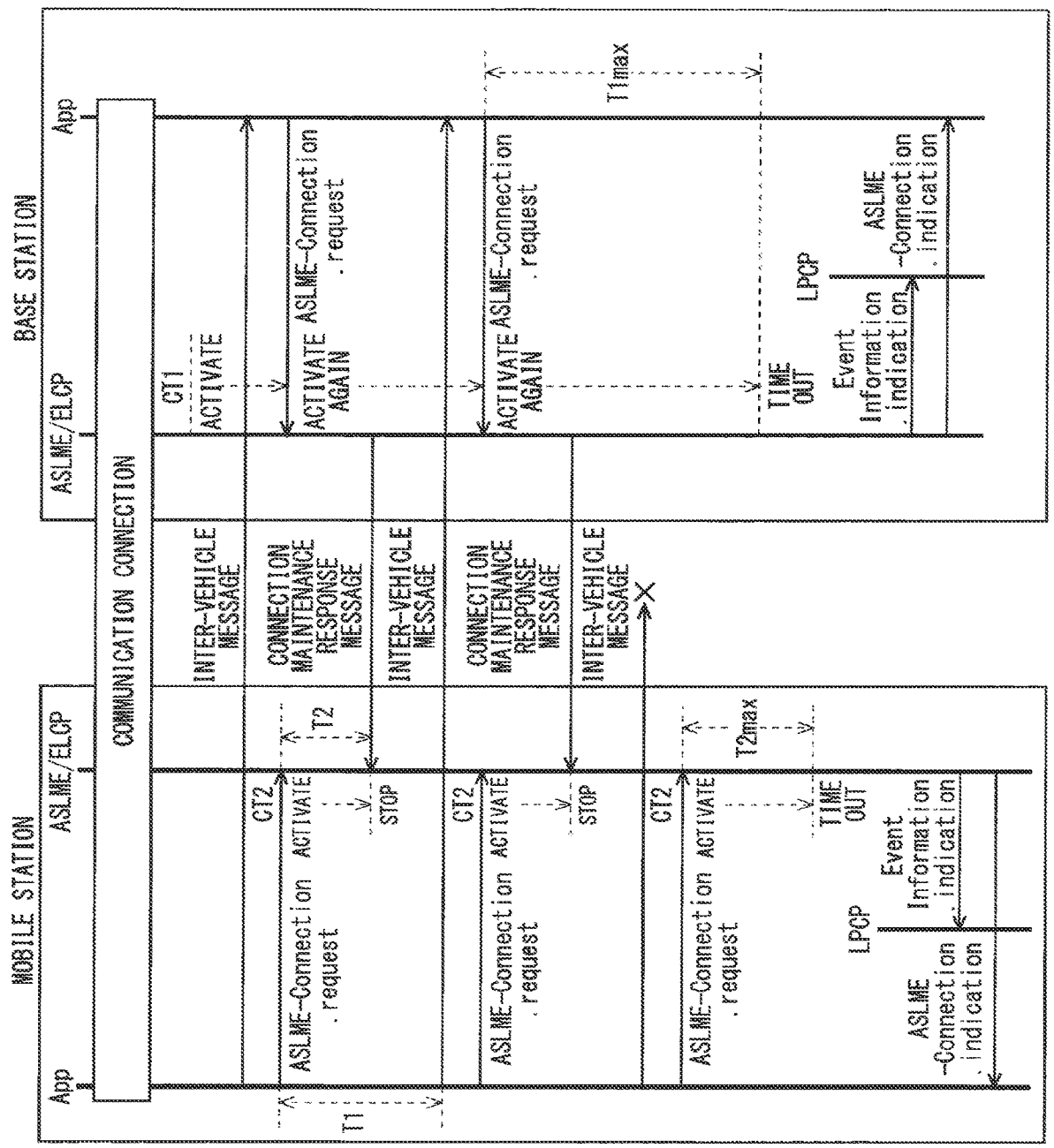
FIG. 16 A sequence diagram showing the connection maintaining procedure in the case of using the inter-vehicle message in a communication between a base station and a mobile station according to the embodiment of the present invention.

FIG. 16 is a diagram showing a basic sequence of a connection maintaining procedure in a case of using the inter-vehicle message in a communication between the base station and the mobile station in the ASLME.

(1) Communication Connection Management Procedure of Mobile Station

The App of the mobile station generates the inter-vehicle message in accordance with a predetermined schedule, and transmits the inter-vehicle message to the surrounding mobile station and the App of the base station via the broadcast communication. After the initial connection procedure is completed, the App of the mobile station designates "a connection maintenance response waiting" as the variable requestCode in the ASLME-Connection. request to the ASLME at a time of transmitting the inter-vehicle message, and requests to wait the connection maintenance response message from the base station.

The ASLME of the mobile station generates the CT2 at the time of completing the initial connection procedure. At this time, T2max is set to the CT2. The ASLME of the mobile station activates the CT2 upon request of the connection maintenance response waiting for managing the communication connection state with the base station. The CT2 is suspended when the connection maintaining response message corresponding thereto is received. When the CT2 times out before the connection maintenance response message can be received, the connection maintenance completion processing is performed, and the connection maintaining procedure is completed.

(2) Communication Connection Management Procedure of Base Station

After the initial connection procedure is completed, the App of the base station designates "a connection maintenance response transmission" as the variable requestCode in the ASLME-Connection. request to the ASLME at a time of receiving the inter-vehicle message, and transmits a request of the transmission of the connection maintenance response message to the mobile station.

The ASLME of the base station generates the CT1 for each mobile station at the time of completing the initial connection procedure. A connection management timer value of the mobile station is set to the generated CT1 with reference to the connection management timer value from a base station profile received using the connection request message, and the CT1 is activated.

Subsequently, the CT1 is activated again every time the request of the connection maintenance response is received from the App. When the CT1 times out before the connection maintenance response is requested from the App, the ASLME of the base station performs the connection maintenance completion processing, and completes the connection maintaining procedure.

3.3. Case of Using Inter-Vehicle Message (Between Mobile Stations)

Figure 17:
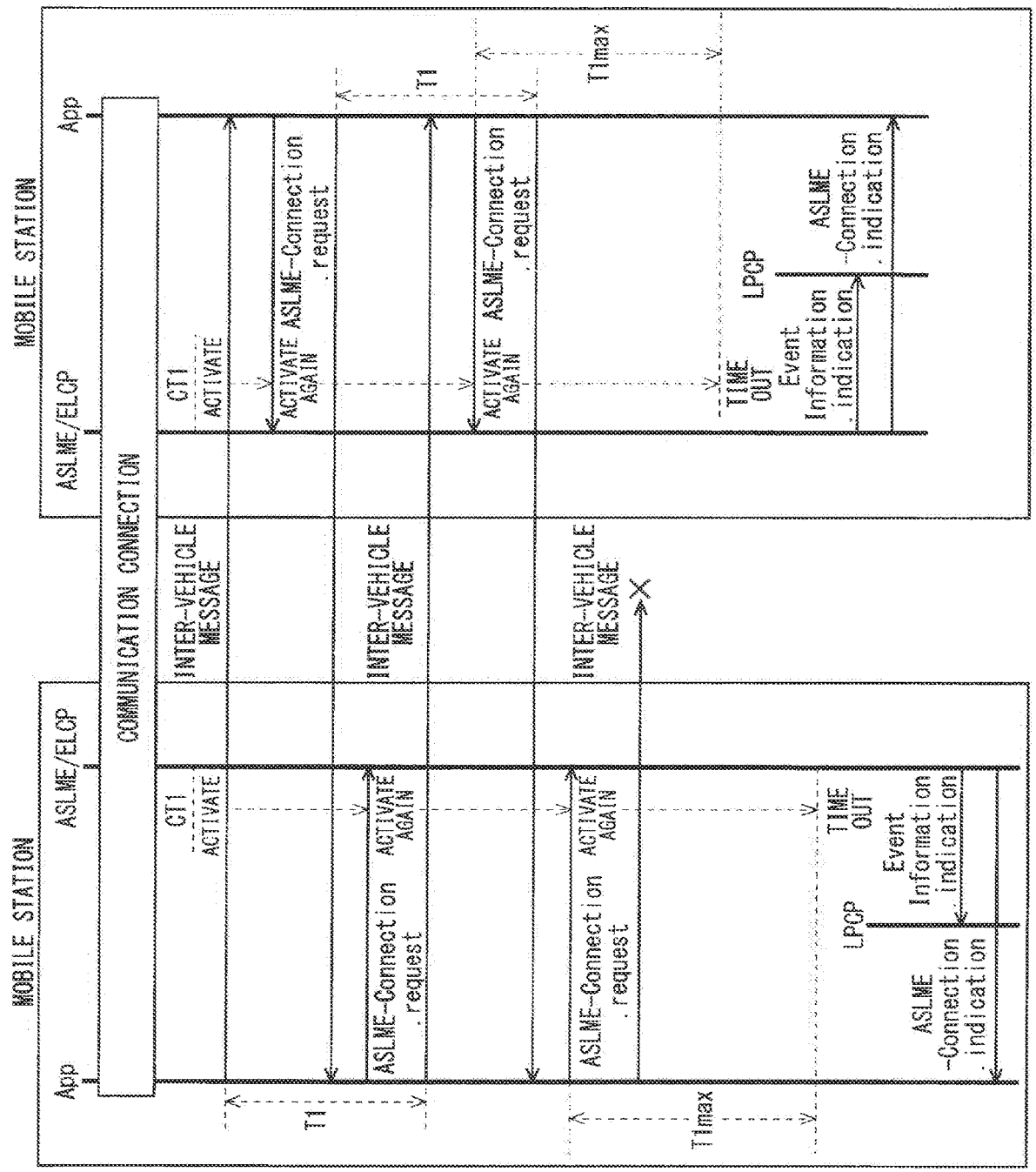
FIG. 17 A sequence diagram showing the connection maintaining procedure in the case of using the inter-vehicle message in a communication between mobile stations according to the embodiment of the present invention.

FIG. 17 is a diagram showing a basic sequence of a connection maintaining procedure in a case of using the inter-vehicle message in a communication between the mobile stations in the ASLME.

The mobile stations transmit the inter-vehicle message to each other in the communication between the mobile stations. Each App of the mobile stations generates the inter-vehicle message in accordance with a predetermined schedule, and transmits the inter-vehicle message to the surrounding mobile station and the App of the base station via the broadcast communication.

After the initial connection procedure is completed, each App of the mobile stations designates "a connection maintenance request reception" as the variable requestCode in the ASLME-Connection® request to the ASLME at a time of receiving the inter-vehicle message, and notifies the mobile station of the reception of the connection maintenance request message.

The ASLME generates the CT1 for each mobile station at the time of completing the initial connection procedure. A connection management timer value of the mobile station is set to the generated CT1 with reference to the connection management timer value from a base station profile received using the connection request message, and the CT1 is activated.

Subsequently, the CT1 is activated again every time the notification of the connection maintenance request reception is received from the App. When the CT1 times out before the notification of the connection maintenance response request is not transmitted from the App, the ASLME performs the connection maintenance completion processing, and completes the connection maintaining procedure.

3.4. Connection Maintenance Completion Processing

The mobile station and the base station finish using the LPCP for the mobile station. The ASLME further issues "a communication disconnection notification" using the ASLME-Connection. indication to the App. In the similar manner, the ASLME issues "a communication disconnection notification" using the ASLME-EventInformation. indication to the ELCP. Upon receiving this, the ELCP issues "a communication disconnection notification" using EventInformation. indication to the LPCP. The ELCP finishes the processing process and the CT1 with the other station, and performs a new connection notification or waits for the broadcast reception. The communication device and the cooperative roadside-to-vehicle and inter-vehicle communication system according to the embodiment 1 operate in accordance with the specification of the inter-vehicle communication sub-protocol described above.

<1-3. Operations of Roadside Communication Apparatus 100 and in-Vehicle Communication Apparatus 200>

Hereinafter, the operations of respective parts of the roadside communication apparatus 100 and the in-vehicle communication apparatus 200 are described using FIG. 18 to FIG. 21 with reference to FIG. 1.

<1-3-1. Operation of Initial Connection in Base Station>

Figure 18:
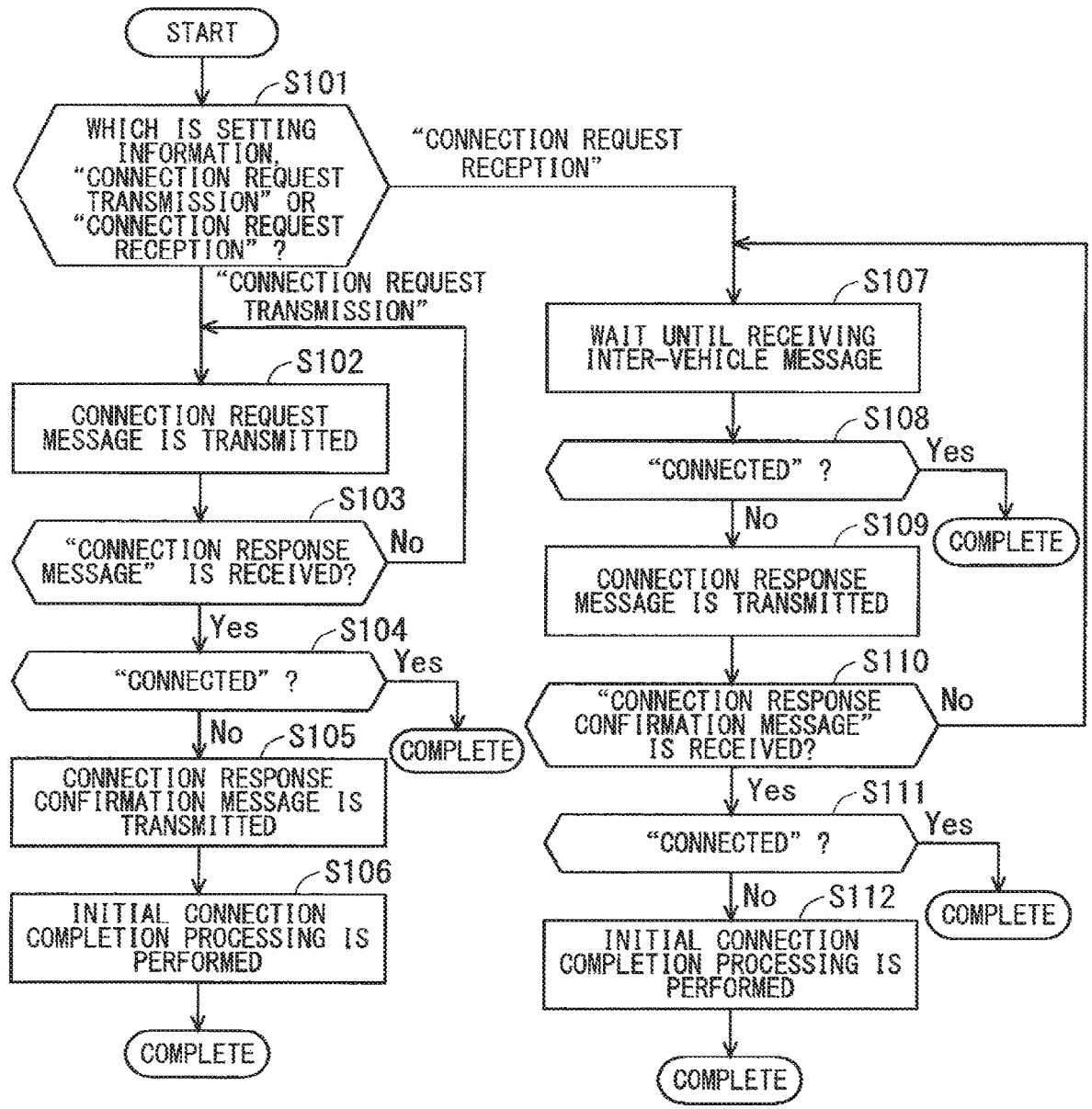
FIG. 18 A flow chart showing an initial connection procedure of a base station according to the embodiment of the present invention.

The operation of the initial connection in the base station on which the roadside communication apparatus 100 is mounted is described using FIG. 18.

FIG. 18 is a flow chart showing a determination of a method of the initial connection procedure in the base station. The roadside communication apparatus 100 executes processing of Step S101 to Step S112 described hereinafter.

In Step S101, the roadside communication management unit 6 confirms setting information regarding the initial connection. When the setting information is "a connection request transmission", the processing transitions to Step S102. When the setting information is "a connection request reception", the processing transitions to Step S107.

In Step S102, the roadside communication management unit 6 transmits a data transmission request of "a connection request message" to the communication transfer unit 2, and activates a timer for the connection response reception. The communication transfer unit 2 transmits "the connection request message" to the surrounding mobile station via the broadcast communication, and the processing transitions to Step S103.

In Step S103, the communication transfer unit 2 waits until the message from the mobile station is received. When the communication transfer unit 2 receives "the connection response message", the processing transitions to Step S104. When the communication transfer unit 2 receives data other than "the connection response message", the communication transfer unit 2 continues waiting, and when the timer for the connection response reception times out, the processing transitions to Step S102.

In Step S104, the communication transfer unit 2 transmits an incoming data notification of "the connection response message" to the roadside communication management unit 6. The roadside communication management unit 6 confirms the connection state of the mobile station included in "the connection response message" with reference to the connection management table. When the connection state is "connected", the initial connection procedure is completed. When the connection state is "not connected", the processing transitions to Step S105.

In Step S105, the roadside communication management unit 6 transmits a data transmission request of "a connection response confirmation message" to the communication transfer unit 2. The cation transfer unit 2 transmits "the connection response confirmation message" to the other station which is designated, and the processing transitions to Step S106. Designated at this time as a transmission destination is the other station included in "the connection response message" received in Step S103.

In Step S106, initial connection completion processing is performed to complete the initial connection processing.

In Step S107, the inter-vehicle application processing unit 4 waits until the inter-vehicle message is received from the mobile station, and when the inter-vehicle application processing unit 4 receives the inter-vehicle message, the processing transitions to Step S108.

In Step S108, the inter-vehicle application processing unit 4 notifies the transmission-and-reception condition management unit 5 of the reception of the inter-vehicle message. The transmission-and-reception condition management unit 5 transmits the connection processing request of "the connection response transmission" to the roadside communication management unit 6. The roadside communication management unit 6 confirms the connection state of the mobile station included in "the connection response transmission" with reference to the connection management table. When the connection state is "connected", the initial connection procedure is completed. When the connection state is "not connected", the processing transitions to Step S109.

In Step S109, the roadside communication management unit 6 transmits a data transmission request of "a connection response message" to the communication transfer unit 2. The communication transfer unit 2 transmits "the connection response message" to the other station which is designated, and the processing transitions to Step S110. Designated at this time as a transmission destination is a mobile station included in the inter-vehicle message received in Step S107.

In Step S110, the communication transfer unit 2 waits until the message from the mobile station is received. When the communication transfer unit 2 receives "the connection response confirmation message", the processing transitions to Step S111. When the communication transfer unit 2 receives data other than "the connection response confirmation message", the communication transfer unit 2 continues waiting, and when the timer for the connection response confirmation reception times out, the processing transitions to Step S107.

In Step S111, the communication transfer unit 2 transmits an incoming data notification of "the connection response confirmation message" to the roadside communication management unit 6. The roadside communication management unit 6 confirms the connection state of the mobile station included in "the connection response confirmation message" with reference to the connection management table. When the connection state is "connected", the initial connection procedure is completed. When the connection state is "not connected", the processing transitions to Step S112.

In Step S112, initial connection completion processing is performed to complete the initial connection processing.

<1-3-2. Operation of Initial Connection in Mobile Station>

Figure 19:
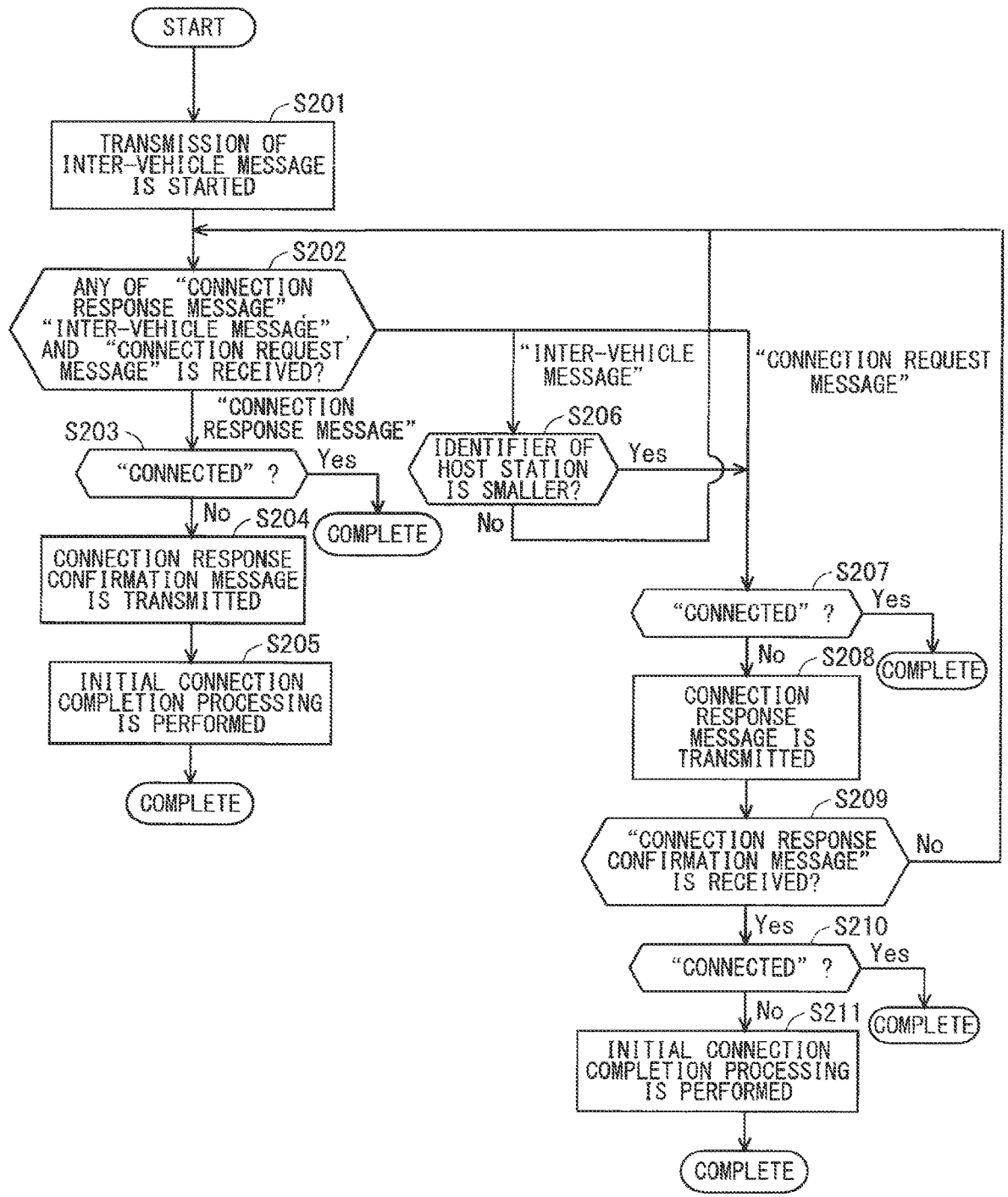
FIG. 19 A flow chart showing an initial connection procedure of a mobile station according to the embodiment of the present invention.

The operation of the initial connection in the mobile station on which the in-vehicle communication apparatus 200 is mounted is described using FIG. 19.

FIG. 19 is a flow chart showing a determination of a method of the initial connection procedure in the mobile station. The in-vehicle communication apparatus 200 executes processing of Step S201 to Step S211 described hereinafter.

In Step S201, the inter-vehicle application processing unit 4 starts transmitting the inter-vehicle message, and the processing transitions to Step S202. In subsequent steps, the inter-vehicle application processing unit 4 periodically transmits the inter-vehicle message via the broadcast communication to the surrounding mobile station or the base station.

In Step S202, the communication transfer unit 2 waits until the message from the mobile station or the base station is received or the inter-vehicle application processing unit 4 receives the inter-vehicle message from the mobile station. When the communication transfer unit 2 receives "the connection response message", the processing transitions to Step S203. When the communication transfer unit 2 receives "the connection request message", the processing transitions to Step S207. When the inter-vehicle application processing unit 4 receives the inter-vehicle message, the processing transitions to Step S206. When the inter-vehicle application processing unit 4 receives data other than "the connection response message", "the connection request message", and the inter-vehicle message, the inter-vehicle application processing unit 4 continues waiting.

In Step S203, the communication transfer unit 2 transmits an incoming data notification of "the connection response message" to the in-vehicle communication management unit 7. The in-vehicle communication management unit 7 confirms the connection state of the base station included in "the connection response message" with reference to the connection management table. When the connection state is "connected", the initial connection procedure is completed. When the connection state is "not connected", the processing transitions to Step S204.

In Step S204, the in-vehicle communication management unit 7 transmits a data transmission request of "a connection response confirmation message" to the communication transfer unit 2. The communication transfer unit 2 transmits "the connection response confirmation message" to the other station which is designated, and the processing transitions to Step S205. Designated at this time as a transmission destination is the mobile station or the base station included in "the connection response message" received in Step S202.

In Step S205, initial connection completion processing is performed to complete the initial connection processing.

In Step S206, the inter-vehicle application processing unit 4 notifies the transmission-and-reception condition management unit 5 of the reception of the inter-vehicle message. The transmission-and-reception condition management unit 5 transmits the connection processing request of "the connection response transmission" to the in-vehicle communication management unit 7. The in-vehicle communication management unit 7 compares the identifier of the mobile station included in "the connection response transmission" and the identifier of the host station in dictionary order. When the identifier of the host station is smaller, the processing transitions to Step S207. When the identifier of the host station is larger, the processing transitions to Step S202.

In Step S207, the communication transfer unit 2 transmits an incoming data notification of "the connection request message" to the in-vehicle communication management unit 7. The in-vehicle communication management unit 7 confirms the connection state of the base station included in "the connection request message" or the mobile station included in "the connection response transmission" with reference to the connection management table. When the connection state is "connected", the initial connection procedure is completed. When the connection state is "not connected", the processing transitions to Step S208.

In Step S208, the in-vehicle communication management unit 7 transmits a data transmission request of "a connection response message" to the communication transfer unit 2. The communication transfer unit 2 transmits "the connection response message" to the other station which is designated, and the processing transitions to Step S209. Designated at this time as the transmission destination is the mobile station included in the inter-vehicle message received in Step S202 or the base station included in "the connection request message".

In Step S209, the communication transfer unit 2 waits until the message from the mobile station or the base station is received. When the communication transfer unit 2 receives "the connection response confirmation message", the processing transitions to Step S210. When the communication transfer unit 2 receives data other than "the connection response confirmation message", the communication transfer unit 2 continues waiting, and when the timer for the connection response confirmation reception times out, the processing transitions to Step S202.

In Step S210, the communication transfer unit 2 transmits an incoming data notification of "the connection response confirmation message" to the in-vehicle communication management unit 7. The in-vehicle communication management unit 7 confirms the connection state of the mobile station or the base station included in "the connection response confirmation message" with reference to the connection management table. When the connection state is "connected", the initial connection procedure is completed. When the connection state is "not connected", the processing transitions to Step S211.

In Step S211, initial connection completion processing is performed to complete the initial connection processing.

<1-3-3. Initial Connection Completion Processing>

In the roadside communication management unit 6 of the base station and the in-vehicle communication management unit 7 of the mobile station, the LPCP is set to be in an enable state for the communication with the other station at the end of the initial connection procedure, and is added to the connection management table as "connected". The roadside communication management unit 6 of the base station and the in-vehicle communication management unit 7 of the mobile station transmit the connection notification of "the initial connection" to the transmission-and-reception condition management unit 5. In the similar manner, the roadside communication management unit 6 of the base station and the in-vehicle communication management unit 7 of the mobile station transmit an event notification of "the initial connection" to the communication transfer unit 2.

<1-3-4. Operation of Connection Maintenance in Base Station>

Figure 20:
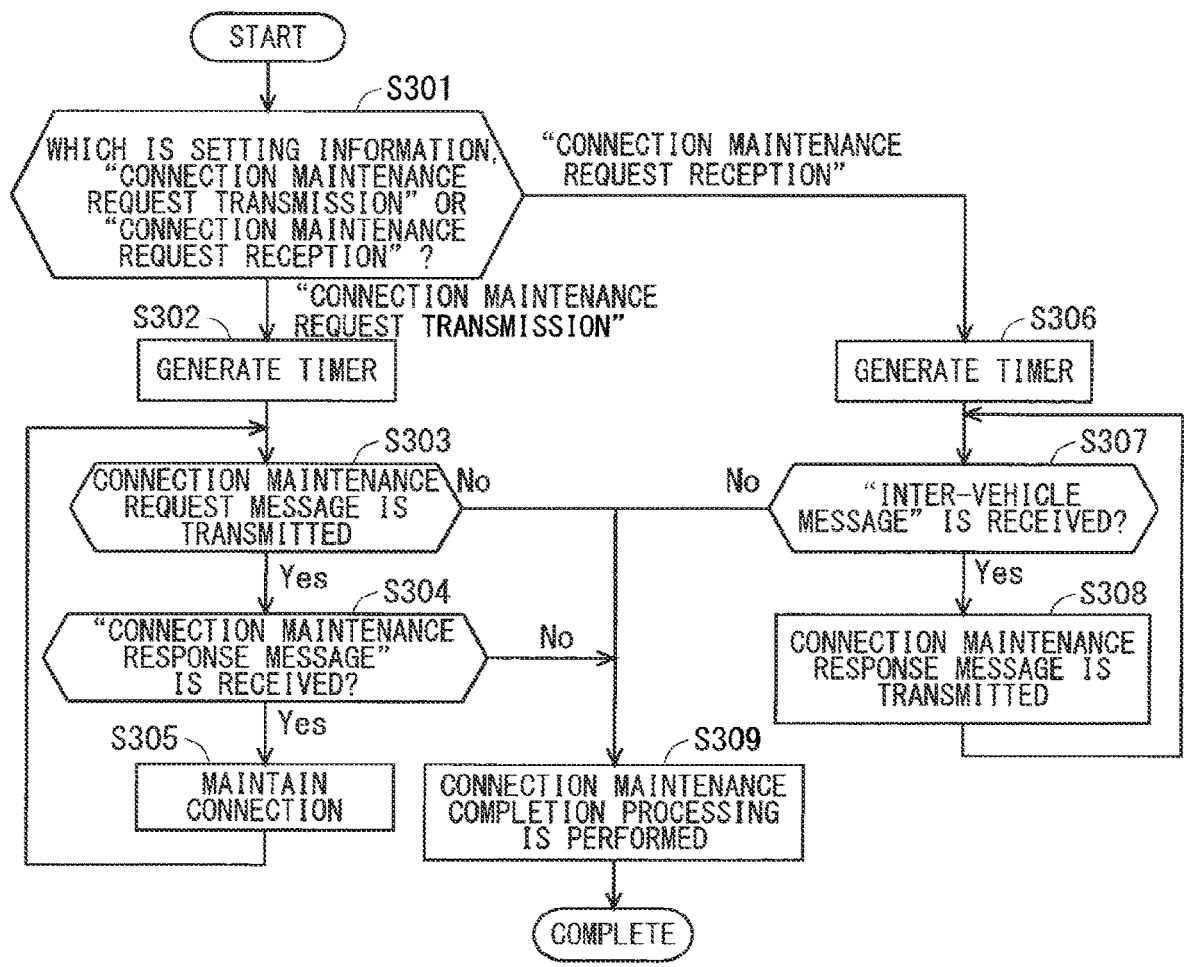
FIG. 20 A flow chart showing a connection maintaining procedure of a base station according to the embodiment of the present invention.

The operation of the connection maintenance in the base station on which the roadside communication apparatus 100 is mounted is described using FIG. 20.

FIG. 20 is a flow chart showing a determination of a method of the connection maintenance procedure in the base station. The roadside communication apparatus 100 executes processing of Step S301 to Step S309 described hereinafter.

In Step S301, the roadside communication management unit 6 confirms setting information regarding the connection maintenance. When the setting information is "a connection maintenance request transmission", the processing transitions to Step S302. When the setting information is "a connection maintenance request reception", the processing transitions to Step S306.

In Step S302, the roadside communication management unit 6 generates the WTTS and the CT2 for each mobile station, and the processing transitions to Step S303. At this time, T2max is set to the CT2, and T1max is set to the WTTS.

In Step S303, the roadside communication management unit 6 transmits a data transmission request of "a connection maintenance request message" to the communication transfer unit 2. The roadside communication management unit 6 further activates the CT2 and the WTTS. At this time, if the WTTS is already activated, the WTTS is activated again. If the WTTS is activated and times out before the reactivation, the processing transitions to Step S309. When the communication lower layer does not provide a retransmission function, the connection maintenance request message performs control of retransmission using a retransmission timer and a retransmission counter. The communication transfer unit 2 transmits "the connection maintenance request message" to the other station, and the processing transitions to Step S304.

In Step S304, the communication transfer unit 2 waits until the message from the mobile station is received. When the communication transfer unit 2 receives "the connection maintenance response message", the processing transitions to Step S305. When the communication transfer unit 2 receives data other than "the connection maintenance response message", the communication transfer unit 2 continues waiting, and when the CT2 times out, the processing transitions to Step S309.

In Step S305, the communication transfer unit 2 transmits an incoming data notification of "the connection maintenance response message" to the roadside communication management unit 6. The roadside communication management unit 6 suspends the CT2, and the processing transitions to Step S303.

In Step S306, the roadside communication management unit 6 generates and activates the CT1 for each mobile station, and the processing transitions to Step S307 At this time, T1max is set to the CT1.

In Step S307, the inter-vehicle application processing unit 4 waits until the inter-vehicle message is received from the mobile station. When the inter-vehicle application processing unit 4 receives the inter-vehicle message, the processing transitions to Step S308. When the inter-vehicle application processing unit 4 receives data other than the inter-vehicle message, the inter-vehicle application processing unit 4 continues waiting, and when the CT1 times out, the processing transitions to Step S309.

In Step S308, the inter-vehicle application processing unit 4 notifies the transmission-and-reception condition management unit 5 of the reception of the inter-vehicle message. The transmission-and-reception condition management unit 5 transmits the connection processing request of "the connection maintenance response transmission" to the roadside communication management unit 6. The roadside communication management unit 6 transmits a data transmission request of "a connection maintenance response message" to the communication transfer unit 2. The roadside communication management unit 6 further activates the CT1 again. The communication transfer unit 2 transmits "the connection response message" to the other station which is designated, and the processing transitions to Step S307. Designated at this time as a transmission destination is a mobile station included in the inter-vehicle message received in Step S307.

In Step S309, the connection maintenance completion processing is performed to complete the initial connection processing.

<1-3-5. Communication Connection Management Processing of Mobile Station>

Figure 21:
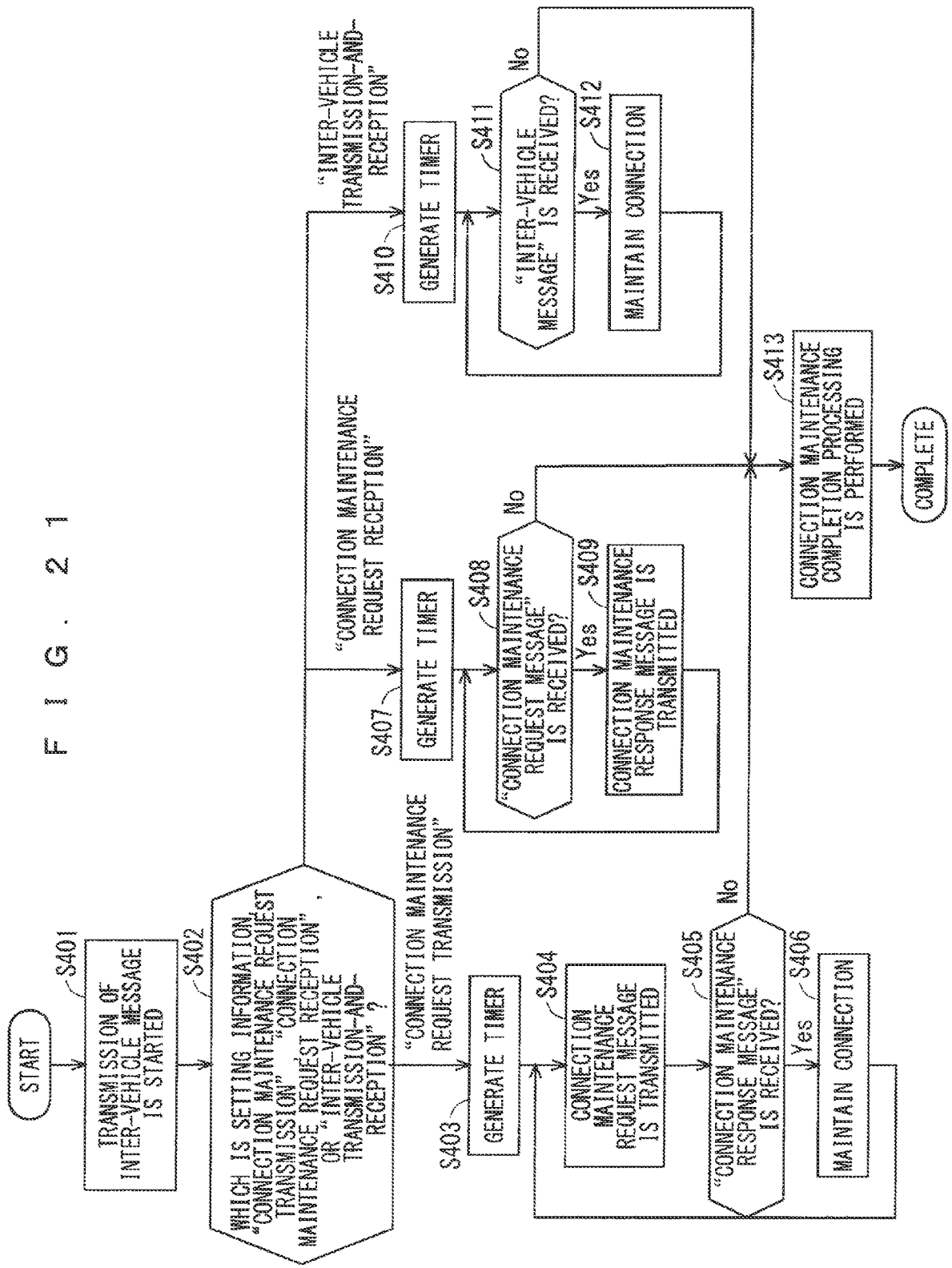
FIG. 21 A flow chart showing a connection maintaining procedure of a mobile station according to the embodiment of the present invention.

The operation of the connection maintenance in the mobile station on which the in-vehicle communication apparatus 200 is mounted is described using FIG. 21.

FIG. 21 is a flow chart showing a determination of a method of the connection maintenance procedure in the mobile station. The in-vehicle communication apparatus 200 executes processing of Step S401 to Step S413 described hereinafter.

In Step S401, the inter-vehicle application processing unit 4 starts transmitting the inter-vehicle message, and the processing transitions to Step S402. In subsequent steps, the inter-vehicle application processing unit 4 periodically transmits the inter-vehicle message via the broadcast communication to the surrounding mobile station or the base station.

In Step S402, the in-vehicle communication management unit 7 confirms setting information regarding the connection maintenance. When the setting information is "a connection maintenance request transmission", the processing transitions to Step S403. When the setting information is "a connection maintenance request reception", the processing transitions to Step S407. When the setting information is "an inter-vehicle transmission-and-reception", the processing transitions to Step S410.

In Step S403, the in-vehicle communication management unit 7 generates the CT2 for each base station, and the processing transitions to Step S404. At this time, T2max is set to the CT2.

In Step S404, the inter-vehicle application processing unit 4 transmits the connection processing request of "the connection maintenance response reception" to the in-vehicle communication management unit 7 after transmitting the inter-vehicle message. The in-vehicle communication management unit 7 further activates the CT2. When the communication lower layer does not provide a retransmission function, the connection maintenance request message performs control of retransmission using a retransmission timer and a retransmission counter. After the processing in Step S404, the processing transitions to Step S405.

In Step S405, the communication transfer unit 2 waits until the message from the base station is received. When the communication transfer unit 2 receives "the connection maintenance response message", the processing transitions to Step S406. When the communication transfer unit 2 receives data other than "the connection maintenance response message", the communication transfer unit 2 continues waiting, and when the CT2 times out, the processing transitions to Step S413.

In Step S406, the communication transfer unit 2 transmits an incoming data notification of "the connection maintenance response message" to the in-vehicle communication management unit 7. The in-vehicle communication management unit 7 suspends the CT2, and the processing transitions to Step S404.

In Step S407, the in-vehicle communication management unit 7 generates and activates the CT1 for each base station, and the processing transitions to Step S408. At this time, T1max is set to the CT1.

In Step S408, the communication transfer unit 2 waits until the message from the base station is received. When the communication transfer unit 2 receives the connection maintenance request message, the processing transitions to Step S409. When the communication transfer unit 2 receives data other than the connection maintenance request message, the communication transfer unit 2 continues waiting, and when the CT1 times out, the processing transitions to Step S413.

In Step S409, the communication transfer unit 2 transmits an incoming data notification of "the connection maintenance request message" to the in-vehicle communication management unit 7. The in-vehicle communication management unit 7 transmits a data transmission request of "a connection maintenance response message" to the communication transfer unit 2. The in-vehicle communication management unit 7 further activates the CT1 again. The communication transfer unit 2 transmits "the connection maintenance response message" to the other station which is designated, and the processing transitions to Step S408. Designated at this time as a transmission destination is a base station included in the connection maintenance request message received in Step S408.

In Step S410, the in-vehicle communication management unit 7 generates and activates the CT1 for each mobile station, and the processing transitions to Step S411. At this time, T1max is set to the CT1.

In Step S411, the inter-vehicle application processing unit 4 waits until the inter-vehicle message is received from the mobile station. When the inter-vehicle application processing unit 4 receives the inter-vehicle message, the processing transitions to Step S412. When the inter-vehicle application processing unit 4 receives data other than the inter-vehicle message, the inter-vehicle application processing unit 4 continues waiting, and when the CT1 times out, the processing transitions to Step S413.

In Step S412, the inter-vehicle application processing unit 4 notifies the transmission-and-reception condition management unit 5 of the reception of the inter-vehicle message. The transmission-and-reception condition management unit 5 transmits the connection processing notification of "the inter-vehicle message reception" to the in-vehicle communication management unit 7. The in-vehicle communication management unit 7 activates the CT1 again, and the processing transitions to Step S411. Designated at this time as a transmission destination is a mobile station included in the inter-vehicle message received in Step S411.

In Step S413, the connection maintenance completion processing is performed to complete the initial connection processing.

<1-3-6. Connection Maintenance Completion Processing>

In the roadside communication management unit 6 of the base station and the in-vehicle communication management unit 7 of the mobile station, the usage of the LPCP is set to be in a suspended state at the end of the connection maintenance procedure, and the connection management table is updated to "not connected". The roadside communication management unit 6 of the base station and the in-vehicle communication management unit 7 of the mobile station transmit the connection notification of "the communication disconnection" to the transmission-and-reception condition management unit 5. In the similar manner, the roadside communication management unit 6 of the base station and the in-vehicle communication management unit 7 of the mobile station transmit an event notification of "the communication disconnection" to the communication transfer unit 2. The roadside communication apparatus and the in-vehicle communication apparatus according to the embodiment 1 operate in accordance with the specification of the inter-vehicle communication sub-protocol described above.

<1-4. Effect>

As described above, according to the present embodiment, the roadside communication apparatus 100 includes the inter-vehicle application processing unit 4 and the transmission-and-reception condition management unit 5. Since the inter-vehicle application processing unit 4 provides the roadside communication management unit 6 with the reception condition of the inter-vehicle message, and the roadside communication management unit 6 uses the reception condition of the inter-vehicle message, a total number of transmissions-and-receptions of the roadside-to-vehicle message necessary to start the initial connection or maintain the connection state can be reduced. That is to say, an increase in a traffic amount in the roadside-to-vehicle communication can be suppressed.

The in-vehicle communication apparatus 200 includes the inter-vehicle application processing unit 4 and the transmission-and-reception condition management unit 5. Since the inter-vehicle application processing unit 4 provides the in-vehicle communication management unit 7 with the transmission-and-reception condition of the inter-vehicle message, and the in-vehicle communication management unit 7 uses the transmission-and-reception condition of the inter-vehicle message, a total number of transmissions-and-receptions of the roadside-to-vehicle message necessary to start the initial connection or maintain the connection state can be reduced. That is to say, an increase in a traffic amount in the roadside-to-vehicle communication can be suppressed.

<1-5. Modification Example>

The message may be transmitted and received using a protocol other than those described above in the embodiment described above. For example, described above are the protocols using the connection request message, the connection response message, and the connection response confirmation message at the time of the initial connection, however, the initial connection can be performed with only the connection request message and the connection response message.

Described in the communication transfer unit 2 is the layered system using the transaction management unit (the local port protocol) and a transfer service processing (the local port control protocol) described in Non-Patent Document 1, however, other protocol capable of bi-directionally communicating may be used in, place of the local port protocol or the local port control protocol. For example, there may be used the protocol IEEE1609.3 under consideration in the U.S.A. and the protocol FAST and Geo-Routing under consideration by the communications architecture for land mobile environment (CALM) in Europe.

Further, the description is given of the structure in which the roadside communication management unit 6 and the in-vehicle communication management unit 7 are arranged in parallel to the roadside-to-vehicle application processing unit 3 and the communication transfer unit 2. However, the WAVE management entity (WME) under consideration in the IEEE1609.3 and the CALM management entity (CME) under consideration in the CALM are also arranged in the same manner as the roadside communication management unit 6 and the in-vehicle communication management unit 7, and thus there may be used the configuration in which the roadside communication management unit 6 and the in-vehicle communication management unit 7 are included in the WME or CME or the configuration including the WME or CME in the roadside communication management unit 6 and the in-vehicle communication management unit 7. Here, the WAVE is an abbreviation for wireless access in vehicular environments. According to the configuration described herein, the interface provided by the roadside communication management unit 6 and the in-vehicle communication management unit 7 may be integrated with the interface of the WME or CME.

An application other than the application related to the ITS may also be used as the roadside-to-vehicle application processing unit 3 and the inter-vehicle application, processing unit 4.

According to the present invention, the above embodiments can be arbitrarily combined, or each embodiment can be appropriately varied or omitted within the scope of the invention.

The present invention has been shown and described in detail, the foregoing description is in all aspects illustrative and not restrictive. It is therefore understood that various modifications not exemplified are construed to be made without departing from the scope of the present application.

EXPLANATION OF REFERENCE SIGNS 1 inter-vehicle transmission-and-reception service processing unit, 2 communication transfer unit, 3 roadside-to-vehicle application processing unit, 4 inter-vehicle application processing unit, 5 transmission-and-reception condition management unit, 6 roadside communication management unit, 7 in-vehicle communication management unit, 100 roadside communication apparatus, 200 in-vehicle communication apparatus.

The invention claimed is:

1. A roadside communication apparatus being mounted on a base station and capable of performing a wireless communication with a communication device being mounted on a mobile station, the roadside communication apparatus comprising processing circuitry configured to operate as:
an inter-vehicle transmission-and-reception service processing unit transmitting and receiving a roadside-to-vehicle message based on a protocol of a roadside-to-vehicle communication and an inter-vehicle message based on a protocol of an inter-vehicle communication to and from the communication device;
a communication transfer unit providing a transaction service including a retransmission and division-and-assembling of the roadside-to-vehicle message being transmitted to and received from the communication device via the inter-vehicle transmission-and-reception service processing unit and a transfer service adding a local port number for identifying an upper protocol;
a roadside-to-vehicle application processing unit transmitting and receiving the roadside-to-vehicle message to and from the communication device via the inter-vehicle transmission-and-reception service processing unit and the communication transfer unit;
an inter-vehicle application processing unit transmitting and receiving an inter-vehicle message to and from the communication device via the inter-vehicle transmission-and-reception service processing unit;
a transmission-and-reception condition management unit managing a reception condition of the inter-vehicle message which the inter-vehicle application processing unit receives from the communication device; and
a roadside communication management unit managing a connection state with the communication device, wherein
the roadside communication management unit manages a connection state with the communication device based on a reception condition of the inter-vehicle message notified by the transmission-and-reception condition management unit.

2. The roadside communication apparatus according to claim 1, wherein
upon receiving the inter-vehicle message from the communication device, the roadside communication management unit confirms a connection state with the communication device.

3. The roadside communication apparatus according to claim 2, wherein
the roadside communication management unit performs a connection with the communication device when a connection state with the communication device is not connected.

4. An in-vehicle communication apparatus being mounted on a mobile station and capable of performing a wireless communication with a communication device being mounted on a base station or another mobile station, the in-vehicle communication apparatus comprising processing circuitry configured to operate as:
an inter-vehicle transmission-and-reception service processing unit transmitting and receiving a roadside-to-vehicle message based on a protocol of a roadside-to-vehicle communication and an inter-vehicle message based on a protocol of an inter-vehicle communication to and from the communication device;

a communication transfer unit providing a transaction service including a retransmission and division-and-assembling of the roadside-to-vehicle message being transmitted to and received from the communication device via the inter-vehicle transmission-and-reception service processing unit and a transfer service adding a local port number for identifying an upper protocol;

a roadside-to-vehicle application processing unit transmitting and receiving the roadside-to-vehicle message to and from the communication device via the inter-vehicle transmission-and-reception service processing unit and the communication transfer unit;

an inter-vehicle application processing unit transmitting and receiving an inter-vehicle message to and from the communication device via the inter-vehicle transmission-and-reception service processing unit;

a transmission-and-reception condition management unit managing a reception condition of the inter-vehicle message which the inter-vehicle application processing unit receives from the communication device; and an in-vehicle communication management unit managing a connection state with the communication device, wherein the in-vehicle communication management unit manages a connection state using a transmission-and-reception condition of the roadside-to-vehicle message notified from the communication transfer unit and reception condition of the inter-vehicle message notified from the inter-vehicle application processing unit via the transmission-and-reception condition management unit.

5. The in-vehicle communication apparatus according to claim 4, wherein upon receiving the roadside-to-vehicle message or the inter-vehicle message for requesting a connection with the communication device from the communication device, the in-vehicle communication management unit confirms a connection state with the communication device.

6. The in-vehicle communication apparatus according to claim 5, wherein the in-vehicle communication management unit performs a connection with the communication device when a connection state with the communication device is not connected.

7. The in-vehicle communication apparatus according to claim 4, wherein the inter-vehicle application processing unit transmits the inter-vehicle message for requesting a connection with the communication device to the communication device.

8. The in-vehicle communication apparatus according to claim 7, wherein the inter-vehicle application processing unit periodically transmits the inter-vehicle message via a broadcast communication.

9. The in-vehicle communication apparatus according to claim 4, wherein the in-vehicle communication management unit completes a connection maintenance when at least one of
a first communication connection management timer for monitoring a reception state of the roadside-to-vehicle message received from the communication transfer unit times out,
a second communication connection management timer for monitoring a reception state of a response to the inter-vehicle message after receiving a request associated with the inter-vehicle message from the inter-vehicle application processing unit via the transmission-and-reception condition management unit times out, and
a third communication connection management timer for monitoring a reception state of the inter-vehicle message received from the inter-vehicle application processing unit via the transmission-and-reception condition management unit times out.

10. The in-vehicle communication apparatus according to claim 4, wherein the in-vehicle communication management unit is configured to complete a connection maintenance based on:

when a first communication connection management timer for monitoring one of a reception state of the roadside-to-vehicle message received from the communication transfer unit and a reception state of the inter-vehicle message received from the inter-vehicle application processing unit via the transmission-and-reception condition management unit times out, and when a second communication connection management timer for monitoring a reception state of a response to the inter-vehicle message after receiving a request associated with the inter-vehicle message from the inter-vehicle application processing unit via the transmission-and-reception condition management unit times out.

11. The roadside communication apparatus according to claim 1, wherein the inter-vehicle message from the communication device includes connection state information from the mobile station.

12. The roadside communication apparatus according to claim 2, wherein the roadside communication management unit confirms the connection state with the communication device by reference to a connection management table that is updated by the roadside communication management unit.

13. The roadside communication apparatus according to claim 1, wherein a combination of the roadside-to-vehicle application processing unit and the communication transfer unit is arranged to communicate with the inter-vehicle transmission-and-reception service processing unit in parallel with a communication between the roadside communication management unit and the inter-vehicle transmission-and-reception service processing unit.

* * * * *